United States Patent
Ives et al.

(10) Patent No.: US 12,109,494 B1
(45) Date of Patent: Oct. 8, 2024

(54) FLEXIBLE VANTAGE POSITIONING USING MULTIPLE DATA SOURCES

(71) Applicant: Amazon Technologies, Inc., Seattle, WA (US)

(72) Inventors: Hayden Matthew Ives, Seattle, WA (US); Nicholas Eng-Rohrbach, Seattle, WA (US); Abhishek Pandey, Sammamish, WA (US); Rohit Agarwal, Issaquah, WA (US); Kevin Francis Delaney, Washington, DC (US)

(73) Assignee: Amazon Technologies, Inc., Seattle, WA (US)

( * ) Notice: Subject to any disclaimer, the term of this patent is extended or adjusted under 35 U.S.C. 154(b) by 299 days.

(21) Appl. No.: 17/393,122

(22) Filed: Aug. 3, 2021

(51) Int. Cl.
    *H04N 13/00*      (2018.01)
    *A63F 13/573*      (2014.01)
    (Continued)

(52) U.S. Cl.
    CPC ............ *A63F 13/65* (2014.09); *A63F 13/573* (2014.09); *A63F 13/812* (2014.09);
    (Continued)

(58) Field of Classification Search
    CPC .......... G06T 17/00; G06T 7/20; G06T 7/246; G06T 7/251; G06T 7/292; G06T 7/55; G06T 7/70; G06T 7/73; G06T 7/75; G06T 13/40; G06T 2200/08; G06T 2207/30221; G06T 2207/30224; G06T 2207/30228; G06V 20/40; G06V 20/42; G06V 20/46; G06V 10/255; G06V 10/764; G06V 10/82;
    (Continued)

(56) References Cited

U.S. PATENT DOCUMENTS

2009/0315978 A1* 12/2009 Wurmlin ................. G06T 7/593
                                                    348/E13.001
2019/0287310 A1* 9/2019 Kopeinigg ............. G06V 20/42
(Continued)

OTHER PUBLICATIONS

"How is a soccer player's running distance calculated during a match?—Quora", Retrieved from Internet <https://www.quora.com/How-is-a-soccer-players-running-distance-calculated-during-a-match>, on Jul. 26, 2021, 1 page.
(Continued)

*Primary Examiner* — Lawrence S Galka

(74) *Attorney, Agent, or Firm* — Kilpatrick Townsend & Stockton LLP

(57) ABSTRACT

Techniques are disclosed for generating a representation of a motion of an object through a physical topography. In one example, a system receives from a camera a sequence of images that shows the motion of the object within a first field of view of the camera that shows a portion of the physical topography, the portion being mapped to a three-dimensional coordinate space. The object is detected using a computer vision model, and a motion profile of the object is determined that maps the motion of the object to the three-dimensional space. The motion profile is provided to a computing service for being combined with audiovisual data (e.g., including a three-dimensional model of the physical topography), and whereby the combined data is then provided to a user device for subsequent presentation.

20 Claims, 8 Drawing Sheets

(51) Int. Cl.
- *A63F 13/65* (2014.01)
- *A63F 13/812* (2014.01)
- *G06F 18/214* (2023.01)
- *G06F 18/241* (2023.01)
- *G06T 7/292* (2017.01)
- *G06T 13/40* (2011.01)
- *G06T 17/05* (2011.01)
- *H04N 5/225* (2006.01)

(52) U.S. Cl.
CPC ........ *G06F 18/2148* (2023.01); *G06F 18/241* (2023.01); *G06T 7/292* (2017.01); *G06T 13/40* (2013.01); *G06T 17/05* (2013.01); *A63F 2300/646* (2013.01); *A63F 2300/69* (2013.01); *A63F 2300/8011* (2013.01); *A63F 2300/8082* (2013.01); *G06T 2200/08* (2013.01); *G06T 2207/30224* (2013.01)

(58) Field of Classification Search
CPC ............. G06V 40/25; H04N 21/23418; H04N 21/44008; H04N 13/111; H04N 13/117; H04N 13/207
See application file for complete search history.

(56) References Cited

U.S. PATENT DOCUMENTS

| | | | |
|---|---|---|---|
| 2020/0193671 A1* | 6/2020 | Tamir | G06T 7/251 |
| 2021/0233304 A1* | 7/2021 | Rowley | G11B 27/031 |
| 2023/0008567 A1* | 1/2023 | Zikos | G06T 17/00 |

OTHER PUBLICATIONS

"Revolutionise Sports Through AI", Retrieved from Internet https://www.statsperform.com/artificial-intelligence/, on Jul. 26, 2021, 7 pages.

* cited by examiner

FLEXIBLE VANTAGE POSITIONING USING MULTIPLE DATA SOURCES

BACKGROUND

Services exist that may facilitate recording an event and distributing a video feed of the event to a customer audience. In some cases, the event may involve various types of activity (e.g., people and/or objects moving around), and the video feed may capture these activities from the perspective of the camera that records the video feed. For example, consider a case in which a camera is positioned (e.g., at mid-field) to record a sporting event (e.g., a football game in a stadium). In this example, the camera may record activities occurring within the game (e.g., passing the football, running down field, etc.) from a mid-field vantage point. Accordingly, the camera may transmit the video feed to a video distribution service (e.g., a television (TV) studio), whereby end-user customers may watch the video feed of the game from the vantage point that is recorded by the camera.

However, challenges exist with respect to these existing services. For example, a video feed that is captured by a particular camera may show activities from the vantage point of the particular camera. In another example, sometimes a particular object in motion (e.g., a game player running) may be at least partially occluded from the view of the particular camera, which may be a less desirable viewing experience.

BRIEF DESCRIPTION OF THE DRAWINGS

Various embodiments in accordance with the present disclosure will be described with reference to the drawings, in which.

DETAILED DESCRIPTION

Figure 1:
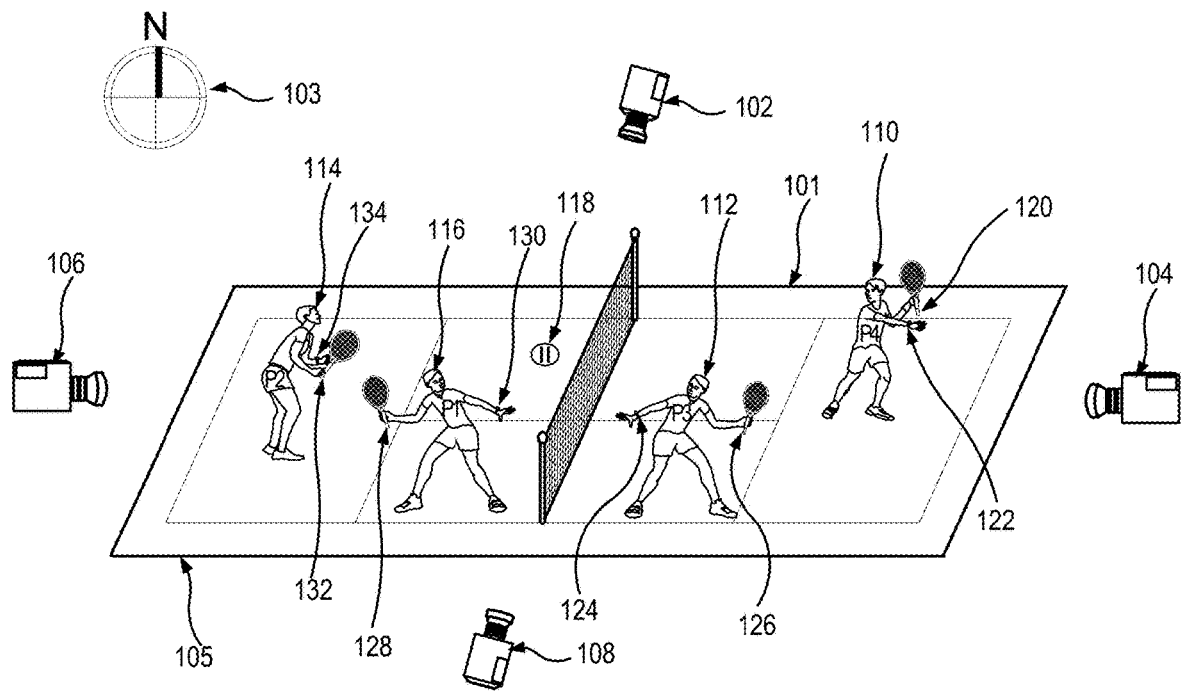
FIG. 1 is a schematic diagram illustrating an example environment for generating motion profiles of one or more objects using data from multiple data sources, in accordance with various embodiments.
Figure 1:
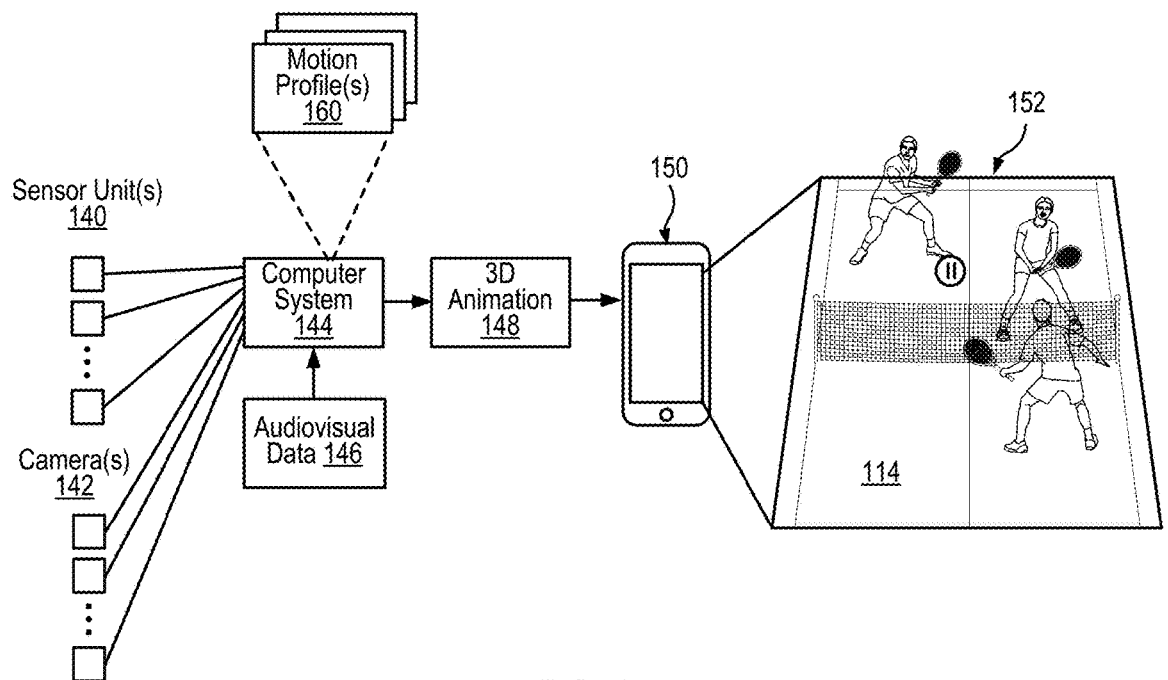

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments described herein are directed to, among other things, techniques for generating data that represents a motion of an object within a three-dimensional physical topography. In some embodiments, the techniques further enable the data representation of the motion of the object to be operable for further analysis and/or combination with other data such that the resulting content (e.g., an audiovisual stream showing the object's motion, a motion heat map, etc.) may be provided to a user device for presentation. Consider an example in which a computer system receives data (e.g., a video feed) from a video camera. The camera may be positioned (e.g., mounted) to have a field of view that shows a portion of a physical topography (e.g., a portion of a tennis court), whereby the portion is mapped to a three-dimensional (3D) coordinate space. A computer vision model of the system uses the received video feed to identify the object (e.g., a tennis ball) traveling through the portion of the tennis court, and further analyzes the video feed to generate a data representation (e.g., a "motion profile") of the motion of the object, whereby the data representation maps the motion of the object to the 3D coordinate space. In this example, motion data of the same object (e.g., the tennis ball) may be similarly obtained, based on a video feed from another camera (e.g., with a different field of view), and incorporated into the motion profile, thereby enabling increased accuracy when tracking the motion of the object The motion profile may further be analyzed and/or combined with other audiovisual data (e.g., another video feed from another camera, a 3D model of the tennis court, an audio recording of the tennis match, etc.) for use in generating content suitable for presentation to a user device. The resulting content may be associated with (e.g., enable) any suitable use case, for example, providing a three-dimensional animation (e.g., a photorealistic video, a virtual reality (VR) and/or augmented reality (AR) environment, etc.) that shows the motion of the object from a different vantage point than that of the mounted camera. Other example use cases may include providing analytics data (e.g., statistics for an associated tennis match) that is generated using the motion profile, enabling a virtual game participation scenario (e.g., via a VR environment), etc.

To further illustrate, consider a scenario in which an event (e.g., a tennis match) occurs within a particular physical topography (e.g., a stadium that includes a tennis court). In this example, there may be a plurality of cameras that are respectively positioned at different locations to capture the tennis match from a particular (e.g., different) vantage point. For example, a first camera of the plurality of cameras may be positioned to capture the tennis match from a side view (e.g., showing a first team on the left side and a second team on the right side). Meanwhile, a second camera may be positioned to capture the tennis match from a particular endpoint of the tennis court (e.g., looking across to the other side). It should be understood that any suitable one or more cameras and/or positioning of respective cameras may be used to perform techniques described herein.

Using the first camera as a representative camera of the plurality of cameras, and, as described above, the first camera may be positioned to show the tennis match from a particular side view. In this example, the particular side view of the first camera may correspond to a first field of view that shows a first portion of the tennis court (and/or the surrounding stadium). The first camera may be communicatively connected to a computer system (e.g., of a video distribution service), whereby the computer system may generate a mapping between the first portion of the tennis court (e.g., shown in the first field of view) and a 3D coordinate space. For example, the computer system may receive an indication of a first position at which the first camera is positioned (e.g., near the stadium seating area). In some embodiments, this indication may be used to determine (e.g., compute and/or obtain) the real-world position of the camera and/or the position (e.g., and/or distance) of the camera relative to other areas of interest within the stadium (e.g., the lines that define/demarcate the tennis court, the surrounding seating area, the umpire's seat, etc.). Based in part on this indication and/or the one or more computations, the computer system may determine the mapping from the first portion, shown in the first field of view, to the 3D coordinate space. In some embodiments, each of the fields of view of the respective cameras of the plurality of cameras may be mapped to the 3D coordinate space. In some embodiments, the computer system may maintain a common 3D coordinate space that is mapped to each of the fields of views. For example, this may be performed based in part on using common reference markers (e.g., tennis court line positions), which may be common to (e.g., included within) more than one field of view. In some embodiments, this may involve triangulating a position based on known real-world positions of objects (e.g., other cameras and/or objects shown within the physical topography). In some embodiments, as introduced above, a camera's position may be determined (e.g., obtained) via any suitable mechanism. For example, the computer system may receive data input that indicates one or more of a real-world position of the camera or a relative position of the camera to other objects (e.g., other cameras, other points of interest in the stadium, etc.). In some embodiments, this data input may be directly mapped to the 3D coordinate space, for example, independent from (e.g., without necessitating) performing further computations (e.g., object position triangulation) to map the camera's field of view to the 3D coordinate space. etc.

Continuing with the illustration, each camera may capture a video feed of the tennis match and transmit the video feed to the computer system. In this illustration, and, continuing with the first camera as a representative camera, a first video feed of the first camera may capture various motions of different objects. This may include, for example, a swing motion of a tennis racket, a motion of the tennis ball, a motion of a player, etc. The computer system may receive the first video feed and perform one or more computations to generate, for each object of interest, a data representation of the motion of the object of interest captured. In some embodiments, the data representation may be stored via a suitable data structure, for example, a "motion profile." In one example, a motion profile may include a table (and/or vector) of data elements that are respectively associated with the motion of the object over time. In some embodiments, when generating a motion profile, a computer vision model of the computer system may receive a sequence of images included in the first video feed, and then execute a machine learning (ML) algorithm to detect (e.g., identify) a type of a particular object (e.g., the tennis ball) shown in the sequence of images. In some embodiments, upon identifying the object, the computer vision model may track the object as the position changes within the sequence of images. The computer system may then determine the motion profile of the object (e.g., the tennis ball) based in part on mapping, over the sequence of images, the position of the identified object to the 3D coordinate space. In some embodiments, the motion profile may include any suitable data, including, but not limited to, a three-dimensional rotation of the object, a three-dimensional position of the object, the type and/or identity of the object (e.g., a tennis ball, player 1, Roger Federer, etc.), a three-dimensional velocity of the object, a three-dimensional acceleration of the object, etc.

In some embodiments, video feeds received from each of the cameras may collectively be used to determine a given motion profile of an object. For example, first data (e.g., including position data, rotation data, etc.), determined from the first sequence of images of the first video feed, may be combined with second data (e.g., including position data, rotation data, etc.), determined from a second sequence of images of a second video feed that is captured by the second camera. Using the example, above, the second video feed may also capture the same tennis ball moving in space, from the vantage position of the second camera. Based in part on the portions of the respective fields of view of each camera being mapped to the same 3D coordinate space, the computing system may combine the first data with the second data to generate the motion profile of the tennis ball. In some embodiments, the combined data may enhance the accuracy and/or precision of the motion profile associated with the motion of the ball. It should be understood that data from any suitable number and/or types of data sources (e.g., data obtained from various camera feeds) may be combined together to generate the motion profile of an object. It should also be understood that a respective motion profile may be generated for any suitable number and/or types of objects captured by the various camera video feeds.

In some embodiments, one or more sensor units may be optionally used to generate motion profiles of objects. In some embodiments, a sensor unit (e.g., an inertial measurement unit (IMU) sensor unit, a global positioning system (GPS) tracking unit, a radio-frequency identification (RFID) tag, etc.) may be physically attached to an object and may transmit sensor data to the computer system. In some embodiments, any suitable sensor unit type may be used, and any suitable sensor data may be transmitted and/or otherwise relayed (e.g., position data, rotation data, etc.). In some embodiments, the received data may be further mapped to the 3D coordinate space. Accordingly, the sensor data may be further combined with other data (e.g., determined from the one or more camera feeds) to generate the motion profile for a given object. In some embodiments, a sensor data may enhance the quality of data of the motion profile, for example, in cases where the object may be partially occluded from being viewed by the plurality of cameras. In another example, the sensor data may enhance the quality of the motion profile when objects are in close proximity to one another (e.g., players in a football game), whereby the sensor data may assist in precisely determining (e.g., differentiating) the motion of each object.

In some embodiments, any suitable combination of one or more sensors may be used to determine a motion profile for an object and/or multiple objects. For example, respective motion sensors may be attached to different players in a game, the ball, the tennis rackets, etc., and the data from each sensor may be transmitted to the computer system and used to generate a motion profile for each object of interest.

In some embodiments, an object may include a plurality of components (e.g., component parts). In some embodiments, the object profile for the object may include motion measurements for one or more of the plurality of components parts. For example, a player correspond to a type of object. In this example, the player may include a forearm, shoulder, head, etc. In some embodiments, the motion profile for the player may include data associated with movements of each of the component parts (e.g., the head being turned, the left arm being lifted and/or rotated, etc.).

Continuing with the above illustration, suppose that motion profiles are generated for each object of interest (e.g., the players, the tennis ball, the rackets, etc.) in the tennis match. In some embodiments, data from these one or more motion profiles may be further analyzed and/or combined with other data (e.g., audiovisual data). In one example, the motion profile data may be analyzed to determine more complex statistics for the particular match (e.g., the number of times the ball reached a threshold speed and/or height, a number of times a particular player approached the net, etc.). In some embodiments, these statistics may be provided for presentation (e.g., via a visual heat map) on a user device. In another example, motion profile data may be combined with audiovisual data that includes a three-dimensional model of the tennis stadium (e.g., including the tennis court). In some embodiments, audiovisual data (e.g., the three-dimensional model) may be further mapped to the 3D coordinate space, which may enable combining the data. In some embodiments, the combined data may enable a new (e.g., unique) three-dimensional animation to be generated, whereby the three-dimensional animation shows the motion of a particular object (e.g., a tennis ball) from a vantage position that is different from the vantage positions of respective cameras of the plurality of cameras. This three-dimensional animation may then be provided to a user device for a three-dimensional presentation, showing the tennis ball moving in the tennis court. In some embodiments, the three-dimensional animation may also show other objects in motion, based on the other motion profiles created, which may have been also combined with the 3D model of the physical topography (e.g., the stadium and/or court).

In some embodiments, the three-dimensional (3D) animation may include any suitable graphical representation (e.g., a sequence of images) that depicts a motion of an object based in part on the motion profile of the object. In one example, the 3D animation may include a photorealistic video stream (e.g., a sequence of images) of the motion of an object (e.g., a tennis ball) moving through the physical topography (e.g., a tennis court). For example, the video stream may be generated based in part on using images from one or more video feeds from real-world cameras and utilizing motion profile data of the tennis ball (and/or a 3D model of the ball). In some embodiments, the video stream may correspond to a livestream of an event that is happening in real time. In some embodiments, the video stream may be generated from a pre-recorded event. In some embodiments, the 3D animation may include a non-photorealistic animation (e.g., not generated from real-world camera video feeds). For example, the 3D animation may be generated based in part on digitally generating animated images (e.g., graphically rendering a motion of a previously generated 3D digital object(s)). In some embodiments, the non-photorealistic animation may be presented in the context of an AR/VR environment (e.g., a video game-type of 3D animation). In some embodiments, the non-photorealistic 3D animation may (or may not) enable user interaction with the computer system, depending on the context. For example, in one use case (e.g., a virtual gaming environment), the non-photorealistic 3D animation may present an animated video stream (e.g., a sequence of animated frames) that shows the tennis game being played, whereby the 3D animation sequence that is displayed depends in part on user input to virtually participate in the game (e.g., a virtual movement, a racket swing, etc.). In another example use case, the non-photorealistic 3D animation may enable the user to view an animated presentation of the game from different aerial vantage points. In some embodiments, similar to the photorealistic video stream, the non-photorealistic animation may (or may) not be generated in real-time (or near real-time).

As described above, generating a 3D animation may enable various use case scenarios. For example, the computer system may provide a viewing experience of the game from flexible vantage positions (e.g., different bird's eye views, different players' perspectives, etc.). In some embodiments, the motion profiles may be further used to create an AR/VR experience, enabling interaction/participation as a virtual player within the game (e.g., participating in the game from a particular player's perspective). For example, a user may be able to practice hitting a tennis ball that has the same motion as was recorded during a game. In some embodiments, any suitable audiovisual data may be combined with other motion profiles and/or other audiovisual data. For example, audio recordings (e.g., an audio stream) of the noise at the tennis stadium during the match may be combined with the motion profile data (e.g., synchronized to the same clock time) to generate an enhanced viewing experience. Accordingly, it should be understood that the motion profile data may be used (e.g., analyzed, transformed, and/or combined with other data) to provide any suitable user applications.

In some embodiments, the motion profiles (and/or various applications enabled using the motion profiles) may be generated and provided in real-time (or near real-time). For example, various camera feeds (with optional sensor data from sensor units) may be received by the computer system and used to generate motion profiles in near-real time (e.g. within 5 milliseconds (ms), 10 ms, 100 ms, 1 second, 5 seconds, 30 seconds, etc.) of the actual game play. The motion profiles may be used to enable a flexible viewing experience of the tennis game in near real-time. Thus, in one example, the computer system may provide a user interface to a user device that offers a plurality of viewing options (e.g., which may not otherwise be directly captured by one of the plurality of cameras that capture the tennis game). The user device may receive a selection of a particular option (e.g., showing the game from the user's favorite player's perspective) and then stream the game in near-real time to the user device for presentation.

Embodiments described herein provide several technical advantages over conventional techniques. For example, techniques enable generation of one or more motion profiles of objects within a physical topography, whereby the motion profile is mapped to a three-dimensional coordinate space of the physical topography. This enables various 3D-based applications, for example, including flexible viewing of the motion of an object in 3D space within a customized three-dimensional animation (e.g., showing a customized vantage point, selected by a user). In another example, embodiments enable providing one or more enhance user experiences, such as participating in the game as a virtual player (e.g., via an AR or VR experience). In yet another example, embodiments, enable generating and presenting 3D analytics data that shows the 3D motion of the object. In another example, by mapping the motion profile to the 3D coordinate space and/or a particular clock time, embodiments may enable efficient integration and/or combination of motion profile data with other data (e.g., audiovisual data, such as an audio stream of an event, a 3D model of the physical topography, a 3D model of players, etc.) to generate an enhanced visualization experience.

For clarity of illustration, embodiments described herein may typically refer to generating a motion profile for objects within the context of a sports arena (e.g., a tennis match happening on a tennis court within a tennis stadium). However, embodiments should not be construed to be so limited. For example, a motion profile may be generated for any suitable object (e.g., a football, a concert performer, a musical instrument, a car, etc.) in motion within a suitable three-dimensional physical topography (e.g., a football stadium, a concert hall, a race track, etc.). Although embodiments herein may typically refer to generating a motion profile using data from a plurality of camera feeds and/or sensor units, embodiments should not be construed to be so limited. For example, a motion profile may be generated based on images (e.g., video frames) received from a single camera. In some embodiments, a motion of an object may correspond to any suitable sequence of positions and/or rotations of an object over a period of time. In some embodiments, the motion may include a period of time that involves no substantive change in the position and/or rotation of the object.

FIG. 1 is a schematic diagram illustrating an example environment for generating motion profiles of one or more objects using data from multiple data sources, in accordance with various embodiments. In the upper portion of FIG. 1, a physical topography 101 (e.g., a tennis court) is depicted, in this example, as an environment for playing sports. In this example, surrounding the tennis court are four cameras (e.g., first camera 102, second camera 104, third camera 106, and fourth camera 108) that are respectively positioned to capture a tennis match from different vantage points. For example, the first camera 102 is mounted at the north side of the tennis court (e.g., as referenced by compass 103), such that the first camera 102 has a first field of view (e.g., facing south) showing a first portion of the tennis court. Similarly, the second camera 104 is mounted at the east side of the tennis court, such that the second camera 104 has a second field of view (e.g., facing west) showing a second portion of the tennis court, and likewise for the third camera 106 and the fourth camera 108.

Turning to the cameras in further detail, in some embodiments, within a particular camera's field of view (e.g., showing a portion of the physical topography 101), one or more known elements may be shown. For example, within the field of view of the third camera 106, at least a portion of the demarcation lines 105 that demarcate the tennis court may be shown. In some embodiments, the position of the third camera 106 relative to the demarcation lines 105 (and/or other stationary objects within a third field of view of the third camera 106, such as an umpire's seat) may be known. In some embodiments, as described further herein, a computer system 144 may perform computations to triangulate the position of each camera, relative to other markers (e.g., which may include other camera positions, the demarcation lines 105, etc.) and/or the known real-world positions of other objects. Accordingly, in some embodiments, the global position (e.g., received via a GPS tracker, attached to a camera) and/or relative position (e.g., relative to objects within the physical topography) of each of the cameras may be determined (e.g., by the computer system 144). In some embodiments, as described further herein, this information may enable the computer system 144 to generate and maintain a 3D coordinate space associated with the physical topography 101. In some embodiments, respective fields of view of the different cameras may be each mapped to the same (e.g., a common) 3D coordinate space that is associated with (e.g., mapped to) the physical topography 101. For example, some of the cameras may capture, within their respective field of view, the same object(s) (e.g., a particular known marker). In this example, the computer system 144 may determine a relative location between each camera and the same common marker (e.g., an intersection of two demarcation lines on the tennis court). Accordingly, based in part on determining the locations (e.g., relative and/or global locations) of the cameras with respect to the physical topography 101 and/or known markers associated with the physical topography 101, the computer system 144 may generate the common 3D coordinate space. It should be understood that the computer system 144 may utilize any suitable method to generate the common 3D coordinate space and/or map respective fields of view to the 3D coordinate space. For example, as described above, the computer system may receive input (e.g., from an administrator) that indicates relative and/or global positions of a camera within the 3D coordinate space. For example, the computer system may receive data input that indicates a camera's position relative to other cameras, a position relative to a marker associated with the physical topography (e.g., demarcation lines 105), a position of the camera within the 3D coordinate space, etc. In some embodiments, this data input may be directly mapped to the 3D coordinate space, for example, independent from (e.g., without necessitating) performing further computations (e.g., object position triangulation) to map the camera's field of view to the 3D coordinate space. etc. In some embodiments, the 3D coordinate space may have three axes (e.g., X, Y, Z). For example, the X-axis may be a horizontal axis that runs along the length of the court (e.g., from west to east, as represented by compass 103). The Y-axis may run along the width of the court (e.g., from north to south). The Z-axis may be perpendicular to the ground. It should be understood that any suitable 3D coordinate system, including the relative positions of the axes and/or the system of coordinates, may be used to perform techniques described herein.

Turning to the elements of the example physical topography 101 (e.g., the tennis court) in further detail, a tennis match is depicted as being in progress. Within this tennis match, one or more objects may be in motion (e.g., players within the match, a tennis ball 118, rackets held by the players, etc.). In this example, the tennis match is a doubles match, with two players on each team. On the west side of the court, player 116 (e.g., holding racket 128) and player 114 (e.g., holding racket 132) form a first team, and, on the east side of the court, player 112 (e.g., holding racket 126) and player 110 (e.g., holding racket 120) form a second team.

In some embodiments, one or more sensor units may optionally be physically attached different objects. For example, as depicted in FIG. 1, player 116 is physically attached to sensor unit 130. For example, sensor unit 130 may be an IMU sensor, which may be included within a wearable device (e.g., a smartwatch) that is physically attached to player 116. It should be understood that any suitable sensor unit may be attached to player 116 (e.g., an RFID tag, a GPS tracker device, etc.), and the sensor unit may be attached to the player at any suitable location and/or via any suitable mechanism (e.g., an ankle strap, embedded in a helmet, attached to glasses, embedded within clothing, etc.). As described herein, a sensor unit may be embedded within another type of device (e.g., a user device), such as a smartwatch or smartphone. In this example, the device that embeds the sensor unit may also (and/or alternatively) be referred to herein as a sensor unit. In some embodiments, more than one sensor unit may be attached to a given object (e.g., a given player, a ball, a racket, etc.). For example, in some embodiments, if an object contains a plurality of component parts (e.g., arms, legs, head, etc.), a different sensor may be attached to one or more of the constituent parts. Continuing with the illustration of FIG. 1, player 114 may similarly be attached to sensor unit 134, player 112 may be attached to sensor unit 124, and player 110 may be attached to sensor unit 122. In some embodiments, depending in part on the type of sensor unit, any suitable data may be generated and/or relayed by the sensor unit (e.g., to computer system 144, described further herein), for example, including a 3D position of the sensor unit (e.g., within the physical topography), a 3D velocity and/or 3D accelerator of the sensor unit, a 3D rotation of the sensor unit, etc.

Turning to the lower portion of FIG. 1, and, as introduced above, computer system 144 is depicted, which may be located at any suitable location. For example, the computer system 144 may be located near the physical topography 101 or in a remote location (e.g., in a remote cloud computing location). In some embodiments, the computer system 144 may include one or more server computers and/or server clusters (e.g., of a cloud computing service). In some embodiments, computer system 144 is communicatively connected (e.g., via a suitable wireless medium) to a plurality of sensor units 140. In FIG. 1, the plurality of sensor units 140 may include representative sensor units 130, 134, 124, and 122, as described in reference to the tennis match depicted in the upper portion of FIG. 1. As describe herein, each of these sensor units may be configured to transmit data (e.g., in real-time) to the computer system 144. In some embodiments, any one or more intermediate computing devices (e.g., switches and/or routers) may be used to relay sensor data from a sensor unit to the computer system 144. It should be understood that, in some embodiments sensor units 140 may optionally be used to perform techniques described herein.

Similar to the plurality of sensor units 140, a plurality of cameras 142 may be communicatively connected to the computer system 144. In FIG. 1, the plurality of cameras 142 may include first camera 102, second camera 104, third camera 106, and fourth camera 108 (e.g., described with respect to monitoring the physical topography 101, depicted in the upper portion of FIG. 1). It should be understood that any suitable number and or types of cameras may be positioned to monitor respective portions of the physical topography 101, and transmit respective video feeds to computer system 144. In some embodiments, a video feed transmitted to computer system 144 may include a sequence of images (e.g., video frames). In some embodiments the sequence of images may capture a motion of an object (and/or motions of a plurality of objects) within the field of view of the camera. For example, as a representative camera, fourth camera 108 may capture a motion of the tennis ball 118, a motion of player 116 and/or the racket 128 that they are holding, a motion of player 112 and/or the racket 126 that they are holding, etc. It should be understood that different cameras may capture motions of the same (or different) objects from different vantage points. For example, second camera 104 may also capture the motion of the tennis ball 118 approach the right (e.g., east) side of the tennis court. In any case, the video feeds from the plurality of cameras 142 may be transmitted to the computer system 144.

As described herein, in some embodiments, the sensor data and/or video feed data may be respectively transmitted in real-time (or near real-time) to the computer system 144. In some embodiments, the data received by the computer system 144 may further be processed in real-time (or near real-time) for subsequent presentation to a user device 150. In some embodiments, the data may not be processed in real-time. For example, the data may be stored to the computer system 144 for later processing. For example, a third-party service and/or the computer system 144 may obtain the data, analyze and/or enhance the data (e.g., generating analytics data from the data), and then provide the resulting data for presentation to the user device 150 at a later time.

In some embodiments, as described herein, upon obtaining data from the one or more sources, the computer system 144 may generate motion profiles that respectively represent a motion of an object that is captured within the data received. In some embodiments, and, as described above, prior generating a motion profile for an object's motion, the computer system 144 may generate and maintain a 3D coordinate space that maps to the physical topography 101. In some embodiments, the computer system 144 may map portions of the physical topography 101, shown within respective fields of view of the plurality of cameras 142, to the 3D coordinate space. For example, the first field of view of the first camera, which shows a first portion of the physical topography 101, may be mapped to the 3D coordinate space. Similarly, other fields of view of the other cameras may also be respectively mapped to the 3D coordinate space. As noted above, it should be understood that the 3D coordinate space may be determined such that each of the fields of view of the plurality of cameras 142 are respectively mapped to the same (e.g., a common) 3D coordinate space.

Continuing with the illustration of generating of a motion profile of an object in further detail, consider tennis ball 118 as an representative object. In some embodiments, each of the plurality of cameras 142 may capture respective video feeds that show the tennis ball 118 moving from one side of the court to the other. In this example, player 114 may have just hit the tennis ball 118 to the east (e.g., right) side of the tennis court. Each video feed may capture the tennis ball 118 motion from different vantage points.

In some embodiments, the computer system 144 may execute a computer vision (CV) model (e.g., which may execute one or more machine learning (ML) algorithms). In some embodiments, the CV model may be trained to detect one or more types of objects (e.g., a tennis ball type). In some embodiments, a different CV model may be utilized, depending on the type of event and/or the particular context/environment. For example, a first CV model may be trained to detect objects associated with a tennis match event (e.g., a tennis ball, a racket, an umpire chair, a net, demarcation lines of the tennis court, players, etc.). In another example, a second CV model may be trained to detect objects associated with a football game event (e.g., a football, a field goal post, a helmet, a referee, a yardage marker, etc.). It should be understood that any suitable algorithms may be utilized to perform CV/ML techniques described herein, for example, a type of neural network, such as a Convolutional Neural Network (CNN) that is trained to detect particular object types of a plurality of object types. In another example, a stacked auto encoder (SAE) may be utilized for object tracking. In some embodiments, the CV model may be able to identify, not only a particular object type, but also component parts of the particular object type being shown.

For example, the CV model may not only detect that a person is shown, but also may be able to detect the person's arms, head, legs, etc. In some embodiments, the CV model may be trained to identify an identity of a person (e.g., Roger Federer, Serena Williams, etc.). In some embodiments, the CV model may trained to detect and/or identify any suitable object and/or object type. For example, in some embodiments, multiple objects (e.g., persons) of the same type (e.g., a human type) may be detected within the same video feed, and the CV model may be able to differentiate (e.g., identify) each person's motion within the video feed.

Continuing with the above illustration, for a given video feed (e.g., received from first camera 102), the computer system 144 may use the CV model to detect and identify, among other objects, tennis ball 118. In some embodiments, the CV model may further be used to track the tennis ball's motion with each of the sequence of images within the particular video feed.

In some embodiments, upon the computer system 144 identifying the tennis ball 118 and tracking its motion within the particular video feed of the first camera 102, the computer system 144 may map the motion of the tennis ball 118 to the 3D coordinate system that was previously generated. For example, as described above, because the computer system 144 may already have mapped the first field of view of the first camera 102 to the common 3D coordinate system, the computer system 144 may be able to determine, for a given frame in the video feed, motion data (e.g., a 3D position, a 3D rotation, etc.) associated with the tennis ball 118, whereby the motion data is relative to the common 3D coordinate space. Furthermore, because the computer system 144 (e.g., via the CV model) may be able to track the motion of the tennis ball 118 over the sequence of images, the computer system 144 may be able to compute further motion data (e.g., over a period of time, represented by the sequence of images of the video feed) based on the determined motion (e.g., a 3D velocity of the ball, a 3D acceleration, etc.). In some embodiments, any suitable motion data associated with the motion of the tennis ball 118 may be computed by the computer system, relative to the 3D coordinate space. In some embodiments, the motion data be stored within a data structure that corresponds to a motion profile of the tennis ball 118. In some embodiments, the data structure may have any suitable format (e.g., a table structure (e.g., see FIG. 4), a tree structure, etc.). In some embodiments, as described further herein, a plurality of motion profiles of different objects may be determined and stored using a similar (or different) format.

In some embodiments, as described above, a video feed from a single camera (e.g., first camera 102) may be used to generate a motion profile of an object (e.g., tennis ball 118). In some embodiments, as referenced above, a plurality of video feeds (e.g., from the plurality of cameras 142) may be used to generate a given motion profile (e.g., for the motion of tennis ball 118). For example, the computer system 144 may use the video feeds from each of the cameras to generate motion data, similar to as described above with respect to first camera 102. It should be understood that the motion data generated from each video feed may be generated with respect to the common 3D coordinate system. In some embodiments, the computer system 144 may generate motion data in parallel and/or sequentially. In some embodiments, the computer system 144 may combine (e.g., merge) the motion data into a single motion profile for the tennis ball 118, based at least in part on the motion data (for each video feed) having a common frame of reference (e.g., the 3D coordinate space). In some embodiments, the process of combining the motion data to the single motion profile may be performed using any suitable technique. For example, the computer system 144 may determine that a first motion data (e.g., associated with the first camera 102) may be more reliable at a particular point in time, and, with respect to the tennis ball 118, than a second motion data (e.g., associated with the second camera 104). For example, the tennis ball 118 may be partially occluded from the vantage point of the second camera at that time. In any case, the computer system 144 may determine to give higher weight to the first motion data for the tennis ball 118 at that point in time. In some embodiments, the computer system 144 may combine motion data determined from the various camera feeds and generate a motion profile for the tennis ball 118. In some embodiments, by using motion data generated from the video feeds of the plurality of cameras 142, the computer system 144 may generate the motion profile with higher fidelity (e.g., higher precision).

In some embodiments, as described herein, one or more sensor units (e.g., the plurality of sensor units 140) may optionally be used to determine a motion profile for an object. Continuing with the illustration of tennis ball 118, in this example, the tennis ball 118 may be physically attached to its own sensor unit (e.g., a GPS tracker, etc.). In some embodiments, as described above, as the game progresses, the sensor unit may transmit sensor data associated with the motion of the tennis ball 118 to the computer system 144. For example, the sensor data may indicate, among other things, a position and/or rotation of the ball. In some embodiments, the sensor data may include global data (e.g., GPS coordinates) and/or data relative to the physical topography 101 (e.g., a distance from the attached object to another known object). In some embodiments, the computer system 144 may combine the sensor data with other data (e.g., motion data) determined from the video feeds of the one or more cameras. For example, the computer system 144 may map the sensor data for the tennis ball 118 to the common 3D coordinate space. The computer system 144 may then merge the data with other data of the motion profile of the tennis ball 118, using any suitable merging algorithm (e.g., determining weights for data, etc.). In some embodiments, sensor data may be weighted higher than data determined from a camera feed, for example, if the respective object is occluded from the camera's view and/or the object is close to other objects (e.g., such that differentiating between objects may be difficult). In this case, the sensor data may be used to further improve precision/fidelity of the data of the motion profile.

In some embodiments, the computer system 144 may use the sensor data and data from the camera feeds to determine any suitable number of motion profiles 160 for respective objects, using a similar technique as described above. In some embodiments, as described above, a motion profile for an object may further include data for component parts of the object. For example, suppose that a motion profile is created for player 116. In this example, the motion profile may include motion data for the overall player 116 (e.g., 3D position data, 3D velocity data, 3D rotation data, etc.). However, the motion profile data may also include data for the component parts of player 116 (e.g. a rotation of the right arm, a position of the left arm, a rotation of the head, a position of each leg, etc.). Any suitable motion data may be determined for a particular component part, which may be the same (or different) as the motion data for the overall object (e.g., player 116). In some embodiments, the motion data for each of the component parts may further by mapped to the 3D coordinate space, using similar techniques as described herein. In some embodiments, the motion data for the component parts may enable the motion of the object to be tracked with even higher fidelity. This may be enabled, in part, using one or more sensor units that are attached to component parts of the object. In one non-limiting example, each component part (e.g., a left arm, right arm, left leg, right leg, head, etc.) of a player 116 may be attached to respective sensor unit. The computer system 144 may then compile this data, and generate a motion profile for the overall player 116, as well as the component parts. In some embodiments, the computer system 144 may generate a motion profile for component parts of an object independent from (e.g., without using) data from sensor units, for example, if sports participants are clearly visible and distinct (e.g., not huddled closely together).

In some embodiments, upon generating the motion profiles 160, the computer system 144 may further perform computing operations using the data. In some examples, the computer system 144 may provide the motion profiles 160 to a computing service (e.g., which may be operated by (and/or otherwise affiliated with) the computer system 144). In some embodiments, the computing service may combine other audiovisual data 146 with the motion profile data. Some non-limiting examples of audiovisual data 146 include an audio stream, video feeds from the one or more cameras, a 3D model of the physical topography 101, 3D models of one or more objects (e.g., a professional player, a chair, a net), etc. For example, suppose that the tennis match depicted in FIG. 1 is a professional tournament that is held within a stadium (e.g., which may be part of the physical topography 101), with many people in attendance. In this example, an audio recording of the event may be generated, which is synchronized to the time period of the game play (e.g., the time period when the motions of objects (e.g., players, balls, etc.) are captured by the plurality of cameras 142 and the optional sensor units 140. Accordingly, the computing service may mix (e.g., multiplex) the audio stream data with the motion profile data, based in part on a common time period reference. In another example, the computer system 144 may receive (e.g., from a third-party provider) a 3D model of the physical topography 101 (and/or any other suitable graphically rendered 3D objects). In some embodiments, the 3D model may also be mapped to the 3D coordinate space, described above. The computer system 144 may combine the motion profiles 160 with the 3D model to generate a 3D animation 148, as described herein (e.g., an graphically rendered animation of the tennis match, for example, within a VR/AR environment). In one example, the 3D animation 148 may show the tennis match within the surrounding physical topography 101, as represented by the 3D model (e.g., of the tennis stadium, tennis court, etc.). The 3D animation 148 may also incorporate the various objects, such that it shows the motions of each of the objects, as represented by the respective motion profiles 160. In some embodiments, the 3D animation 148 may (or may not) utilize the 3D model and/or one or more video feeds from the plurality of cameras 142, for example, to show the tennis match occurring within a real-world environment (e.g., showing a photorealistic view of the actual scenery of the tennis court) or a virtual environment (e.g., showing a virtual rendering of the tennis court), from a different vantage point than captured by the plurality of cameras 142. As described herein, the 3D animation may include any suitable graphical representation of a motion of an object, based on the motion profile of the object. In some embodiments, the audio stream may further be combined with the video stream 148 to generate a holistic user experience. In some embodiments, a 3D model of one or more players (e.g., known professional players) may further be combined with the motion profiles and/or other audiovisual data 146, for example, to generate a VR environment, whereby a user may virtually participate in a game and/or interact with other players. In yet another example, and, as depicted further in reference to FIG. 3, the motion profiles 160 may be used to generate analytics reports that may include more complex statistical data, analyzing the game play. In any case, the motion profiles 160 may be used to perform any suitable computing operations, thus, enabling a layered approach, whereby different (e.g., more variety and/or more complex) customer experiences may be enabled.

Continuing with the illustration of FIG. 1, in one example, the 3D animation 148 may be provided by the computer system 144 to a user device 150 (e.g., a mobile phone, tablet, PC, etc.) for presentation. In this example, and, as depicted further in reference to FIG. 2, the 3D animation 148 may enable a viewing experience of the game whereby the tennis match, depicted in the upper portion of FIG. 1 occurring with physical topography 101, is displayed via user device 150 from a different (e.g., flexible) vantage position (e.g., a vantage point) from those captured by the plurality of cameras 142. For example, user device 150 may display the tennis match from vantage point 152. In this case, vantage point 152 may be from the perspective of player 114, whereby the user device 150 may enable visualization of the game experience from player 114's perspective. This may be useful for example, to enable a VR experience, whereby a user may experience the event as though they were part of the actual sports game (e.g., as a sports game participant) as they participate in the gaming environment (e.g., the tennis match). For example, the user device 150 may display the tennis ball 118 approaching as though the user was actually participating in (e.g., playing) the game. As described further, in reference to FIG. 2, in some embodiments, the motion profiles 160 may enable the 3D animation 148 to show the game from one or more (e.g., flexible) real-world and/or virtual/augment reality vantage positions.

Figure 2:
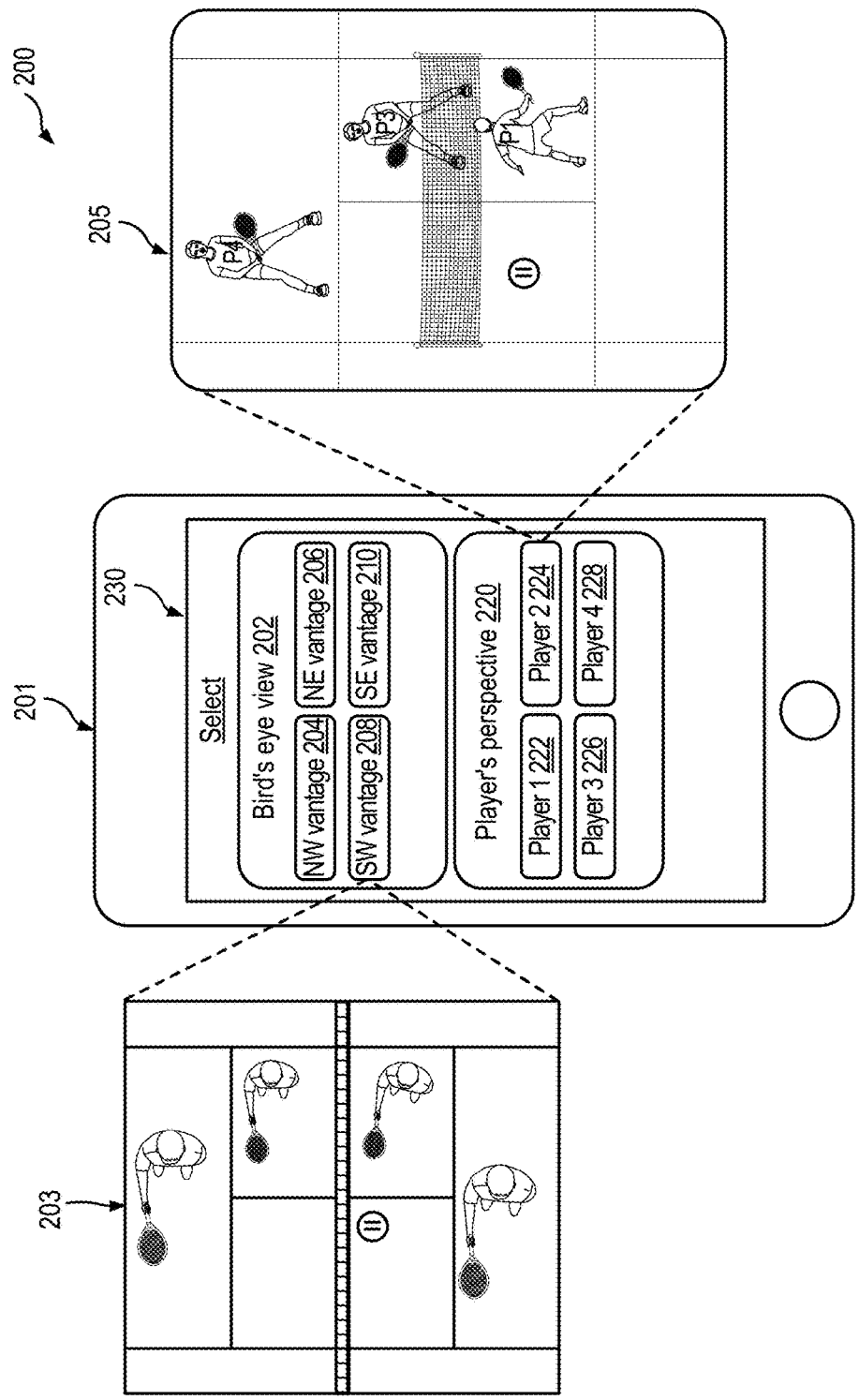
FIG. 2 illustrates a graphical user interface (GUI) that enables selection of a particular vantage point for presenting video content that shows a motion of an object from the particular vantage point, in accordance with various embodiments.

FIG. 2 illustrates a graphical user interface (GUI) that enables selection of a particular vantage point for presenting video content that shows a motion of an object from the particular vantage point, in accordance with various embodiments. In diagram 200, a user interface 230 of a user device 201 is depicted. The user device 201 may be similar to user device 150 of FIG. 1. In diagram 200, the user interface 230 enables flexible selection of a particular vantage position of a plurality of candidate unique vantage positions for viewing the sports game (e.g., the tennis match) described in reference to FIG. 1. The vantage positions may be unique at least in part because they may provide a field of view of an event (e.g., a sports event) that is not actually directly recorded by a physical camera, but instead, generated utilizing techniques described herein. For example, in user interface 230, two categories of unique vantage positions are presented: a bird's eye view category 202, and a player's perspective category 220. It should be understood that any suitable vantage positions may be enabled (e.g., generated) for selection by a user, based in part on the generation of motion profiles. For example, in one embodiment, the user device 201 may enable a random selection of a particular point within a physical topography (e.g., physical topography 101). Upon receiving the selection from a user, computer system 144 of FIG. 1 may dynamically generate (e.g., in near real-time) a 3D animation (e.g., similar to 3D animation 148, which may include generating a new video stream. For example, the new video stream may include a sequence of photorealistic images showing the game (e.g., based in part on using one or more video feeds from real-world cameras). In another example, the new video stream may include a sequence of non-photorealistic images that are generated by rendering animation of one or more previously generated 3D objects (e.g., of a ball, a stadium, a person, etc.). In any case, in this example, the 3D animation shows a unique field of view from the particular point selected by the user. In some embodiments, the computer system 144 may dynamically generate this video stream by combining a 3D model of the tennis court and/or live video streaming data with the motion profile data of the various objects being tracked. As described herein, this combining process may be enabled based in part on the various data objects (e.g., the 3D model of the tennis court, the motion profiles, the one or more video feeds, etc.) being standardized (e.g., synchronized/mapped) to the common 3D coordinate space.

Turning to the user interface 230 of user device 201 in further detail, the bird's eye view category 202 may itself include a plurality of candidate unique vantage positions, including, a Northwest (NW) vantage position 204, a Northeast (NE) vantage position 206, a Southwest (SW) vantage position 208, and a Southeast (SE) vantage position 210. In some embodiments, these vantage positions may be relative to compass 103 of FIG. 1. For example, Southwest vantage position 208 may show a bird's eye view of the tennis match, as though a camera were mounted in the Southwest corner of the physical topography (e.g., a tennis stadium) and showing (e.g., facing) the tennis court. In one example, upon receiving a selection of "SW Vantage" 208, the user interface 230 by updated to display user interface 203 (e.g., a bird's eye view of the tennis court from the Southwest vantage position).

Continuing with the user interface 230, the player's perspective category 220 may also include a plurality of candidate unique vantage positions, including "Player 1" perspective 222, "Player 2" perspective 224, "Player 3" perspective 226, and "Player 4" perspective 228. In one example, "Player 1" may be similar to (e.g., the same as) player 116 of FIG. 1, "Player 2" may be similar to player 114, "Player 3" may be similar to player 112, and "Player 4" may be similar to player 110. Upon selection of an option (e.g., "Player 2" perspective 224), the user interface 230 may be updated to display user interface 205. User interface 205 may be similar to vantage point 152 of FIG. 1, for example, showing the tennis game from a player's perspective.

It should be understood that user interface 230 provides an example interface for enabling a flexible viewing experience. Any suitable user interface may be provided for presentation based on the motion profiles 160. For example, as described herein, in another embodiment, another type of user device (e.g., a smart glasses device) may be used. In this example, the smart glasses may enable a VR or AR experience, whereby the user may virtually participate in the game as a particular sports game participant (e.g., virtually hitting the tennis ball in the tennis match, virtually catching the football in a football game, driving a race car around the track from the point of view of sitting in the cockpit of the car, virtually watching a concert from the point of view of a concert participant, etc.). In yet another example, techniques herein may enable a view from an aerial position, which may correspond to a top-down viewing experience or a virtual bird's eye view experience. For example, a sports game may be virtually projected onto a table-top (e.g., via a hologram presentation format), whereby a customer could walk around the table and view the sports game from any suitable perspective. Accordingly, by generating motion profiles for various object's motions, various possible user interfaces and/or viewing experiences may be enabled. It should be understood that these user interfaces may be enabled in part by combining (e.g., mixing) the motion profile data with other data, as described herein (e.g., a 3D model of a physical topography, a 3D model of a game participant, a 3D model of the interior of a race car, etc.).

Figure 3:
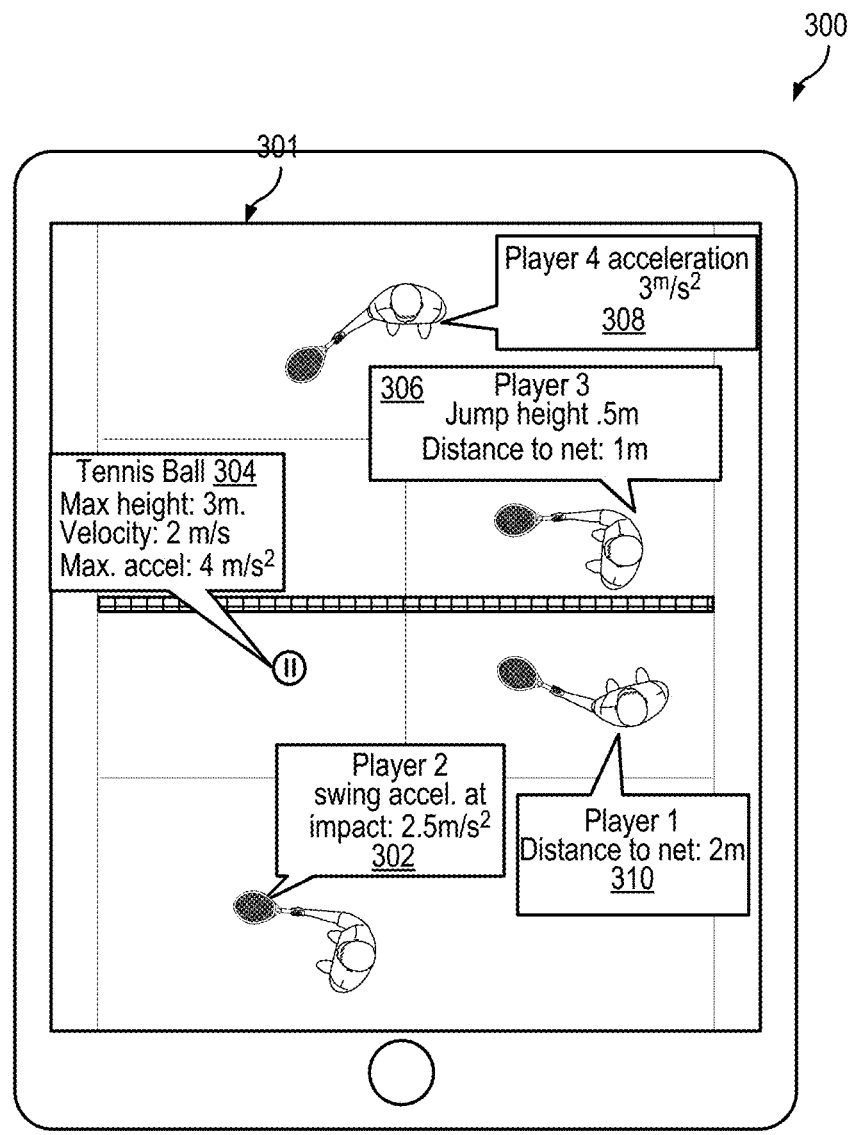
FIG. 3 illustrates a graphical user interface (GUI) for presenting analytics data based on a motion profile associated with a motion of an object, in accordance with various embodiments.

FIG. 3 illustrates a graphical user interface (GUI) for presenting analytics data (e.g., as another example user application) based on a motion profile associated with a motion of an object, in accordance with various embodiments. In some embodiments, diagram 300 depicts another example user interface 301 that may presented by a user device (e.g., user device 150) based on motion profiles of objects (e.g., motion profiles 160) generated by a computer system (e.g., computer system 144 of FIG. 1).

Turning to user interface 301 in further detail, various elements are depicted, which may respectively be associated with analytics data associated with an event. For example, continuing with the illustration from FIG. 1, analytics data for a sports game (e.g., a tennis match) may be depicted. In this example, the user interface 301 may show analytics data in the form of various statistics associated with the tennis game from a top-down (or bird's eye) perspective. In some embodiments, the statistics may be presented within a 3D animation (e.g., 3D animation 148), as the game is in progress (e.g., in near-real time) or in a later recording. It should be understood that the analytics data may be presented in any suitable format based on the motion profile data of different objects. For example, in another example, a three-dimensional heat map may be generated. The 3D heat map may show movements of various objects, whereby the color of the object may depend on the speed, acceleration, height, etc.

Continuing with user interface 301, various example statistics are displayed (e.g., as a balloon pop-up message within the user interface 301) in association with different objects. For example, statistic 302 indicates that "Player 2" is swinging the racket and has an acceleration of 2.5 meters/second$^2$ (m/s$^2$) at the point of impact. Statistic 304 may indicate that the tennis ball (e.g., tennis ball 118 of FIG. 1) reaches a current (and/or maximum) height of 3 m, the current velocity is 2 m/s, and the maximum acceleration during this volley is 4 m/s.$^2$ Statistic 306 may indicate that "Player 3" reached a jump height of 0.5 m, and is at a distance to the net of 1 m. Statistic 308 may indicate that "Player 4" is moving with acceleration 3 m/s$^2$. Statistic 310 may indicate that "Player 1" is currently at a distance from the net of 2 m.

It should be understood that the example statistics elements presented within user interface 301 as analytics data are representative examples of possible data that may be generated and presented. Any suitable analytics data may be provided, according to techniques herein. This may depend on the context (e.g., a race car event, a musical concert, a football game, a theatrical performance, etc.). For example, a distance traveled per play may be presented as analytics data for a football game.

In some embodiments, as described above, the analytics data may be generated based in part on motion profile data. For example, consider the motion profile for the tennis ball 118 of FIG. 1, which may be used to generate statistic 304 in FIG. 3. In this example, motion profile data may be further analyzed, for example, to determine the maximum height (and/or acceleration) that the ball reaches, for a given volley play. While this data may not be directly derived based on the video feed data (and/or optional sensor unit data), this data may be derived from the motion profile data. Accordingly, a richer set of statistics may be determined by using motion profiles. In another example, motion profile data for multiple objects (and/or types of data for each object) may be analyzed together to generate 3D analytics data. For example, motion profile data for "Player 2," their racket, and the tennis ball, may be analyzed to determine the acceleration of the ball at the point of impact on the racket. Various data inputs may include, for example, the movements of component parts of "Player 2's" body (e.g., their arm, when swinging the racket), the 3D rotational angle at which the racket impact the ball, the speed of the ball immediately before impacting the racket, etc. In some embodiments, as described herein, sensor data from the optional sensor units may enrich the analytics data to provide increased fidelity. For example, a sensor unit attached to a player's legs or arms may produce sensor data that enables a more precise calculation (and/or replay) of movements of the person's body. In some embodiments, the analytics data may further be determined based on computing relationships between moving objects (e.g., with associated motion profiles) and stationary objects. For example, assuming that the net on the tennis court remains stationary (e.g., minimal movement), the computer system may compute a player's distance to the net based on a relative distance between the player and the net (e.g., see statistics 310, 306). It should be understood that the analytics data may be presented in any suitable format, using the motion profile data that is mapped to the 3D coordinate space. For example, in another embodiment, the analytics data of user interface 301 may display the analytics data, showing motion (e.g., velocity, acceleration, etc.) with respect to the three axes (e.g., X, Y, and Z) of the 3D coordinate space. In some embodiments, the analytics data may be transformed to any suitable units (e.g., two-dimensional (2D) units) for presentation to a user device.

Figure 4:
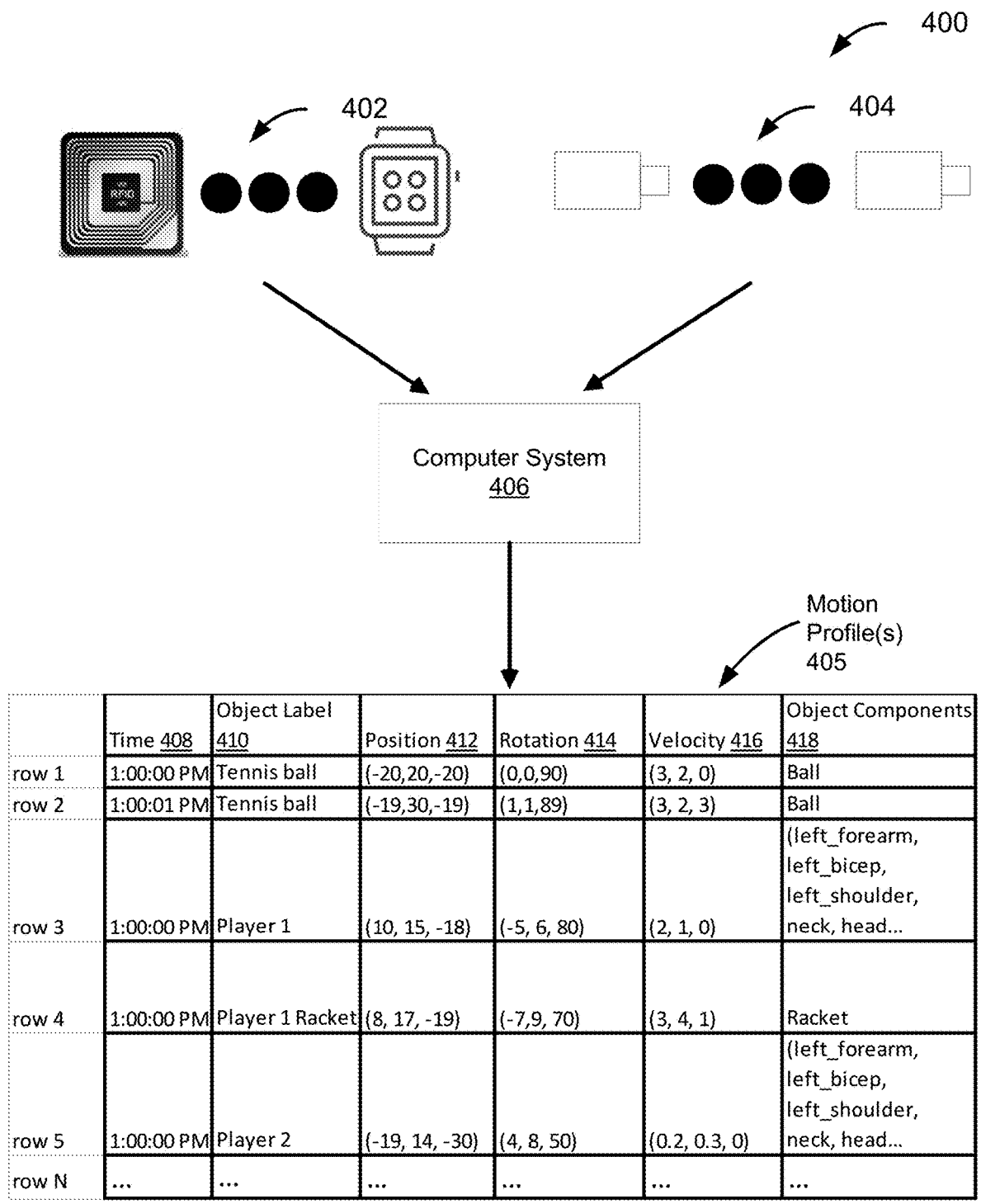
FIG. 4 is a block diagram illustrating an example technique for generating a motion profile associated with a motion of an object, in accordance with various embodiments.

FIG. 4 is a block diagram illustrating an example technique for generating a motion profile associated with a motion of an object, in accordance with various embodiments. In diagram 400, various elements are depicted, including a plurality of sensor units 402 (e.g., which may be similar to the plurality of sensor units 140), a plurality of cameras 404 (e.g., which may be similar to the plurality of cameras 142), a computer system 406 (e.g., which may be similar to computer system 144), and a motion profile table 405. As described herein, the computer system 406 may receive a video feed (e.g., a sequence of images) from each of the plurality of cameras 404 and optional sensor data from each of the plurality of sensors 402, whereby the computer system 406 may generate one or more motion profiles of the motion of different objects. In some embodiments, motion profile table 405 may include representative examples of motion profile entries for different objects that are depicted within physical topography 101 of FIG. 1. In some embodiments, each row of motion profile table 405 may correspond to an example motion profile entry for a particular motion profile. In some embodiments, a motion profile entry may correspond to a particular measurement associated with a motion of a particular object at a point in time (e.g., referenced by time column 408). Accordingly, there may be a plurality of motion profile entries that compose a particular motion profile. As described above, the entries of motion profile table 405 are representative (e.g., not exhaustive) examples of possible motion profile entries. For example, suppose that a particular period of motion measured for the tennis ball 118 lasts for 1 minute (e.g., from 1:00 PM until 1:01 PM). In this example, assuming an entry is generated per second, then there may be 60 motion profile entries for the particular motion profile for the tennis ball (e.g., as labeled via object label column 410). Accordingly, the two entries for the tennis ball (e.g., represented by the first two data rows of table 405) are example entries for the motion profile of the tennis ball. It should be understood that entries (e.g., measurements) may be generated according to any suitable time cadence. In some embodiments, each motion profile for a distinct object (e.g., and/or component part of an object) may be associated with a distinct data structure (e.g., a separate table). In some embodiments, the motion profiles may be combined to form a single data structure (e.g., a single table, as depicted in motion profile table 405).

Turning to motion profile table 405 in further detail, the table includes 7 columns (e.g., data fields), including time column 408, object label column 410, position column 412, rotation column 414, velocity column 416, object components column 418, and notes column 420. As described above, the time column 408 may correspond to a time for the particular entry (e.g., row). The object label column 410 may correspond to a label for the object and/or object type associated with the particular motion profile entry. For example, as noted above rows 1 and 2 are associated with a "Tennis Ball," row 3 is associated with "Player 1," row 4 is associated with "Player 1's Racket," and row 5 is associated with "Player 2." Note that, in this case, both "Player 1" and "Player 2" may be the same "type" of object (e.g., a sports player), but are different people, and may be differently labeled, so as to differentiate the players. In some embodiments, data for object label column 410 may be determined based in part on a computer vision model of the computer system 406, as described herein.

Continuing with motion profile table 405, the position column 412 may be associated with a three-dimensional position of the respective object for the given entry. For example, a given entry may have position coordinates in the form of (X, Y, Z), in accordance with the three axes of the common 3D coordinate space of the physical topography (e.g., physical topography 101) maintained by the computer system 406. Rotation column 414 may be associated with three-dimensional rotational data for a given object's entry. In some embodiments, data within rotation column 414 may also (and/or alternatively) be associated with an 3D orientation and/or 3D angular velocity of the respective object. Velocity column 416 may be contain three-dimensional velocity data associated with a respective object. In some embodiments, data fields for rotation column 414 and velocity column 416 may have a similar (or different) format from that of position column 412 (e.g., (X, Y, Z)). In some embodiments, while the data format of a column may be similar to data formats of other columns, the values may different, depending, for example, on the type of measurement and/or the unit of measurement for the particular the particular column and/or the particular type of object. In some embodiments, as described herein, the measurements may be performed relative to the three-dimensional coordinate space maintained by the system 406. It should be understood that any suitable number of columns (e.g., data field types) may be included for a given motion profile (and/or a given motion profile entry). For example, in another embodiment, motion profile table 405 may additionally include a column for three-dimensional acceleration of an object, three-dimensional momentum, etc. In some embodiments, a data values for entries in a particular column may be determined in part from data values in one or more other columns of the same (or different) motion profile. For example, acceleration may be determined in part from position and/or velocity data.

Continuing with motion profile table 405, object components column 418 may include motion profile data for various component parts of an object. For example, consider row 3, corresponding to a motion profile entry for "Player 1." In this example, the data field for column 418 of row 3 may contain information for, among other component parts, the left forearm, the left bicep, the left shoulder, the neck, the head, and/or any other suitable body parts of "Player 1," as described herein. In some embodiments, a different (e.g., separate) row motion profile entry may be included for each component part. In some embodiments, the motion profile entry for the overall object (e.g., "Player 1") may contain data fields for each of the component parts. Any suitable data relationships and/or structuring of data may be used to perform techniques herein. In some embodiments, the entry for "Player 2" may (or may not) include a similar plurality of component parts. Continuing with notes column 420, this column may include any suitable information (e.g., metadata) associated with the motion profile. For example, a data value for column 420 (e.g., see row 3 for "Player 1") may indicate that "Player 1" is likely stationary during this period of time. In another example, a data value for an entry for column 420 may indicate that a racket is being lifted (e.g., see row 4 for "Player 1 Racket"). In yet another example, a data value for an entry for column 420 may indicate that "Player 2" is swinging their racket while standing in place (see row 5 for "Player 2").

It should be understood that the columns shown in motion profile table 405 are example columns. A motion profile for an object may contain any suitable number of motion profile entries and/or any suitable types of data per motion profile entry. As described herein, these data values may be used to further compute other analytics data, which may require more complex computations, for example analyzing/comparing data from multiple motion profiles to generate a particular inference (e.g., determining which player lobbed a tennis ball highest during the match).

Figure 5:
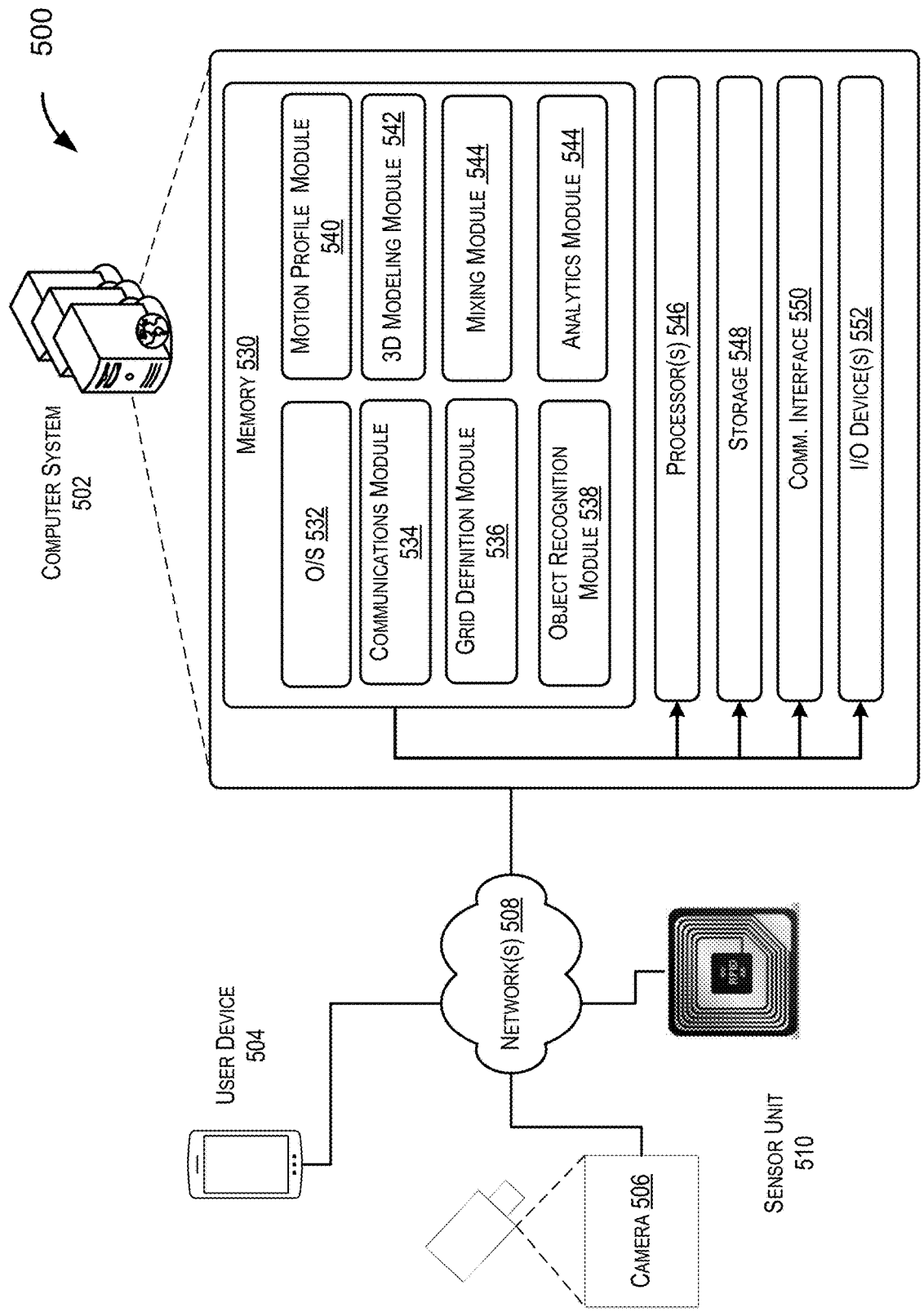
FIG. 5 is a block diagram illustrating an example architecture of a computing system suitable for generating a motion profile of an object, in accordance with various embodiments.

FIG. 5 is a block diagram illustrating an example architecture of a computing system suitable for generating a motion profile of an object, in accordance with various embodiments. In diagram 500, several elements are depicted, including a user device 504, a camera 506, a sensor unit 510, one or more networks 508, and a computer system 502. In some embodiments, these elements may be similar to any similarly named respective elements described herein.

Turning to the elements of diagram 500 in further detail, the network 508 may include any suitable communication path or channel such as, for instance, a wire or cable, fiber optics, a telephone line, a cellular link, a radio frequency (RF) link, a WAN or LAN network, the Internet, or any other suitable medium. The network 508 may include any one or a combination of many different types of networks, such as cable networks, the Internet, wireless networks, cellular networks, and other private and/or public networks.

In some embodiments, the user device 504 may be any suitable computing device (e.g., a mobile phone, tablet, personal computer (PC), smart glasses, a smart watch, etc.). The user device 504 may have at least one memory, one or more processing units (or processor(s)), a storage unit, a communications interface, and/or an input/output (I/O) device(s). In some embodiments, the memory of the user device 504 may include a module for executing one or more applications for communicating with the computer system 502. For example, an application may request for a video stream (e.g., a type of 3D animation 148) from the computer system 502. Another example application may request a 3D animation that corresponds to a VR or AR-based presentation of content to smart glasses.

In some embodiments, the camera 506 may be a representative camera of a plurality of cameras (e.g., the plurality of cameras 142 of FIG. 1). In some embodiments, camera 506 may correspond to any suitable camera for capturing and transmitting a video feed (e.g., including a sequence of images/frames) to the computer system 502. In some embodiments, the plurality of cameras may be of the same or different types. In some embodiments, as described herein, the computer system 502 (e.g., grid definition module 536) may obtain information about a real-world and/or relative position of camera 506, with respect to a physical topography. In some embodiments, the camera 506 may be positioned (e.g., mounted) to have a field of view of a portion of the physical topography. In some embodiments, if a plurality of cameras involved, the different cameras may (or may not) have overlapping fields of view of the physical topography.

In some embodiments, the sensor unit 510 may be any suitable device that performs measurements (and/or otherwise is utilized for performing measurements) of a physical environment. Some non-limiting examples of suitable sensor units may be include a GPS tracking device, an RFID tag, an IMU sensor unit, etc. In some embodiments, a sensor unit may be embedded within another type of device (e.g., a user device), such as a smartwatch or smartphone. In this example, the device that embeds the sensor unit may also (and/or alternatively) be referred to as a sensor unit. In some embodiments, the sensor unit 510 is an optional unit for performing techniques herein. In some embodiments, the sensor unit 510 (and/or a plurality of sensor units) may be communicatively connected (e.g., via network 508) to the computer system 502, for example, regularly transmitting and/or otherwise relaying sensor data.

Turning to the computer system 502 in further detail, the computer system 502 may include at least one memory 530, one or more processing units (or processor(s)) 546, a storage unit 548, a communications interface 550, and an input/output (I/O) device(s) 552.

The processor(s) 546 may be implemented as appropriate in hardware, computer-executable instructions, firmware or combinations thereof. Computer-executable instruction or firmware implementations of the processor(s) 546 may include computer-executable or machine executable instructions written in any suitable programming language to perform the various functions described.

The memory 530 may store program instructions that are loadable and executable on the processor(s) 546, as well as data generated during the execution of these programs. Depending on the configuration and type of the computer system 502, the memory 530 may be volatile (such as random access memory (RAM)) and/or non-volatile (such as read-only memory (ROM), flash memory, etc.). In some implementations, the memory 530 may include multiple different types of memory, such as static random access memory (SRAM), dynamic random access memory (DRAM) or ROM. The computer system 502 may also include additional storage 548, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some embodiments, the storage 548 may be utilized to store, among other data, raw data received from camera 506 and/or sensor unit 510, one or more motion profiles, audio stream data of an event, 3D model data of a physical topography, one or more 3D coordinate space mappings, analytics data, 3D model data of various objects, one or more computer vision models, etc.

The computer system 502 may also contain the communications interface 550 that allow the computer system 502 to communicate with a stored database, another computing device or server, user terminals, and/or other devices on the network(s) 508. The computer system 502 may also include I/O device(s) 552, such as for enabling connection with a keyboard, a mouse, a pen, a voice input device, a touch input device, a display, speakers, a printer, etc.

Turning to the contents of the memory 530 in more detail, the memory 530 may include an operating system 532 and one or more application programs or services for implementing the features disclosed herein, including a communications module 534, a grid definition module 536, an object recognition module 538, a motion profile module 540, a 3D modeling module 542, a mixing module 544, and an analytics module 544.

The communications module 534 may comprise code that causes the processor 546 to generate messages, forward messages, reformat messages, and/or otherwise communicate with other entities. For example, the communications module 534 may receive video feed data from camera 506 (e.g., among a plurality of cameras), sensor unit data from sensor unit 510, and/or user data from user device 504 (e.g., including user requests for presentation of a user interface, 3D animation (e.g., video stream) content, analytics data, or any suitable user application data). The communications module 534 may further transmit data to entities, for example, transmitting user response data (e.g., a video stream) to user device 504. In some embodiments, communications module 534 may also communicate with third-party entities, for example, which may further analyze and process motion profile data and/or provide data to the computer system 502 for further processing (e.g., combining) with the motion profiles.

The grid definition module 536 may comprise code that causes the processor 546 to generate and/or maintain a three-dimensional coordinate space that is associated with a particular physical topography (e.g., a sports arena, a concert hall, etc.). In some embodiments, module 536 may further maintain a mapping between a portion of the physical topography shown in a field of view of a camera (e.g., camera 506) and the three-dimensional coordinate space. In some embodiments, the 3D coordinate space may be common between different cameras. For example, a data received from a first camera and a second camera, which may both show the same object (e.g., a tennis ball in the air) may be used to triangulate a particular position (e.g., of the tennis ball) within the 3D coordinate space.

The object recognition module 538 may comprise code that causes the processor 546 to detect and/or identify one or more objects. For example, as described with respect to FIG. 1, module 538 may execute one or more computer vision and/or machine learning models that may be used to detect a particular object and/or track the motion of the object over time. In some embodiments, module 538 may be used to label the type of object and/or a specific identity of an object (e.g., distinguishing the object from other objects of the same type). Non-limiting examples of objects in include people, cars, balls, musical instruments, sports equipment, etc. The motion profile module 540 may comprise code that causes the processor 546 to generate a motion profile for an object. In some embodiments, this may be performed similar to as described herein (e.g., with respect to FIGS. 1 and 4). For example, the module 540 may process (e.g., combine) data received from various sources (e.g., camera 506, sensor unit 510) and determine a motion profile for a particular object over time. The motion profile may map the motion of the object to the 3D coordinate space.

The 3D modeling module 542 may comprise code that causes the processor 546 to determine a 3D model of one or more entities and/or integrate the 3D model with one or more motion profiles. For example, module 542 may obtain a schematic diagram of a physical topography (e.g., physical topography 101, such as a sports arena). In some embodiments, the schematic diagram may be mapped to a 3D coordinate space (e.g., the same 3D coordinate space as motion profiles determined by the system). In some embodiments, the 3D modeling module 542 may (or may not) determine modeling data for other three-dimensional objects (e.g., people, chairs, nets, stadium seating, etc.) within the physical topography. In some embodiments, the 3D modeling data for various objects may further be combined with motion data for those objects.

The mixing module 544 may comprise code that causes the processor 546 to combine data from multiple sources. For example, a motion profile for an object may be combined with a an existing video recording to generate a 3D animation that shows the motion of the object from a different vantage position than the original video recording (e.g., see FIG. 2). In some embodiments, the mixing module may utilize other data for mixing with the motion profile, including, but not limited to, an audio stream of an event associated with the motion of the object, a 3D model of the object, a 3D model of the physical topography, analytics data from other similar events, etc. In some embodiments, this module may invoke the 3D modeling module 542, with respect to integrating one or more 3D models with the motion profiles. In some embodiments, the type of mixing performed may be determined based on the target user application the resulting data is intended for. For example, in one user scenario, motion profiles may be combined with 3D modeling data to generate a VR/AR presentation (e.g., via smart glasses), whereby the user can interact as a virtual participant in the event. In another user scenario, motion profiles may be combined with a live video stream, so that a user can select a particular vantage position when viewing an event (e.g., a sports game). In yet another example user scenario, motion profiles may be combined with other analytics data to generate a heat map and/or a report of highlights of an event.

The analytics module 544 may comprise code that causes the processor 546 to generate analytics data using motion profile data generated by the system. In some embodiments, this module 544 may perform operations similar to as described in reference to FIG. 3.

Figure 6:
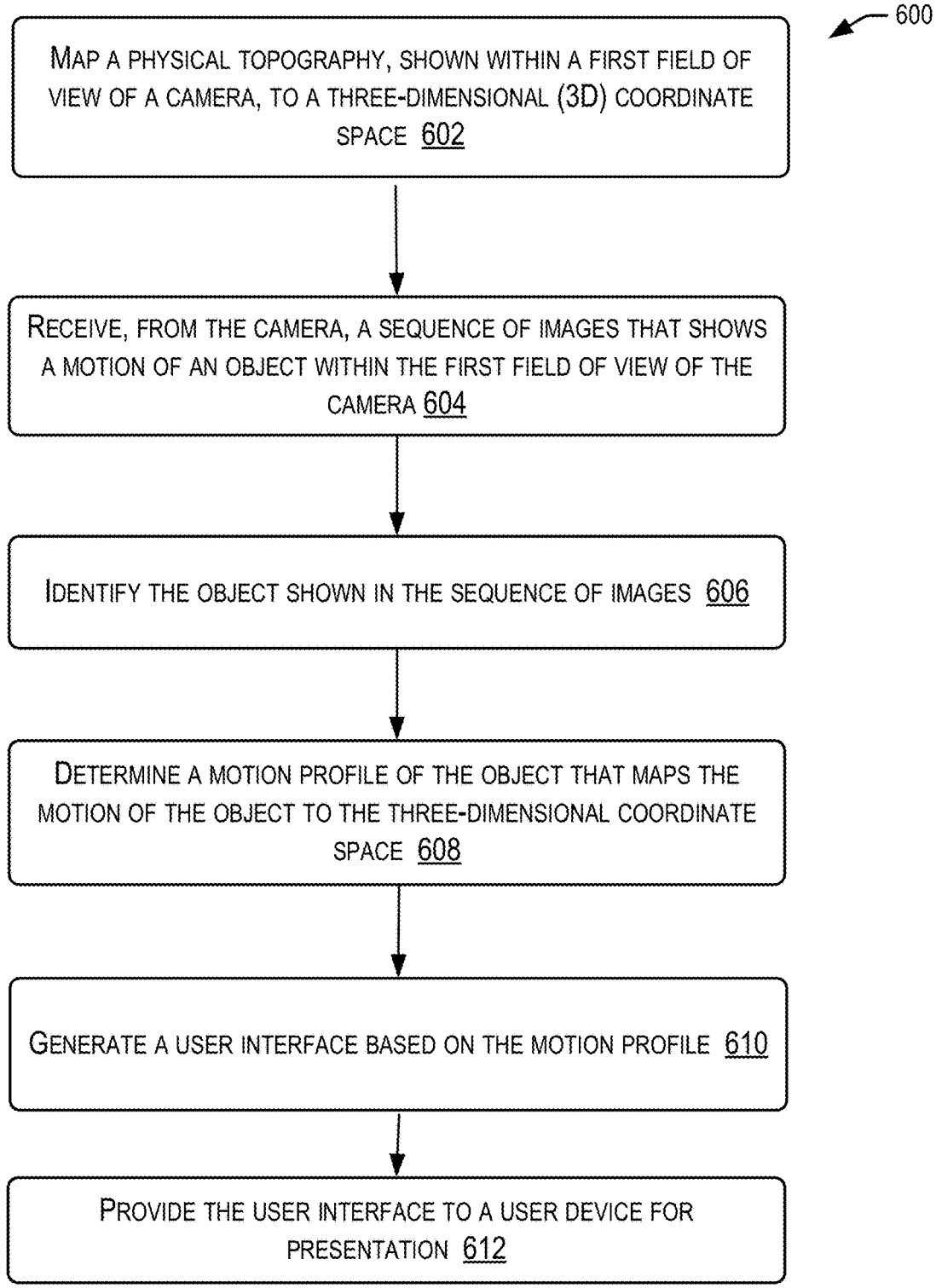
FIG. 6 is a flow diagram illustrating a method for providing a motion profile of an object, in accordance with various embodiments.

FIG. 6 is a flow diagram illustrating a method for providing a motion profile of an object, in accordance with various embodiments. In some embodiments, process 600 and/or process 700 may be performed by a computer system described herein (e.g., computer system 144 of FIG. 1, computer system 502 of FIG. 5, etc.). Process 600 of FIG. 6 and process 700 of FIG. 7 (described below) are respectively illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Some or all of the process 600 and/or process 700 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

At block 602, the process 600 includes mapping a physical topography, shown within a first field of view of a camera, to a three-dimensional (3D) coordinate space. In some embodiments, the camera may be one of a plurality of cameras, as described herein. For example, the camera may be a first camera that shows a first portion of the physical topography within the first field of view, and a second camera may show a second portion of the physical topography with a second field of view. In some embodiments, the second portion of the physical topography may also be mapped to the 3D coordinate space. In some embodiments, the respective cameras may be positioned with a fixed field of view, such that a real-world and/or relative position of the camera is known (e.g., with respect to the physical topography and/or other objects associated with the physical topography).

At block 604, the process 600 includes receiving, from the camera, a sequence of images that shows a motion of an object within the first field of view of the camera. For example, the sequence of images may be included within a video feed that is transmitted from the camera to the computer system. In some embodiments, the object may be any suitable physical object, as described herein.

At block 606, the process 600 includes identifying the object shown in the sequence of images. In some embodiments, a computer vision model (and/or machine learning model) may be used to identify the object and/or track the motion of the object, as represented by the sequence of images.

At block 608, the process 600 includes determining a motion profile of the object that maps the motion of the object to the 3D coordinate space. In some embodiments, one or more operations of this block may be similar to as described herein, for example, with respect to FIGS. 1 and/or 4. In some embodiments, data from multiple sources (e.g., a plurality of cameras and optional sensor units) may be combined together to generate the motion profile.

At block 610, the process 600 includes generating a user interface based on the motion profile. In some embodiments, the user interface may correspond to any suitable user application. For example, the user interface may be suitable for enabling viewing a real-world event from a flexible vantage position (e.g., see FIG. 2). In another example, the user interface may be suitable for showing the event within a virtual reality and/or augmented reality environment (e.g., within a 3D animation, as described herein), such that the user may virtually participate in the event. In another example the user interface may correspond to an analytics report (e.g., a heat map).

At block 612, the process 600 includes providing the user interface to a user device for presentation. In some embodiments, the user interface may be provided in real-time (or near real-time), relative the actual performance of the event in which the motion of the object is occurring.

Figure 7:
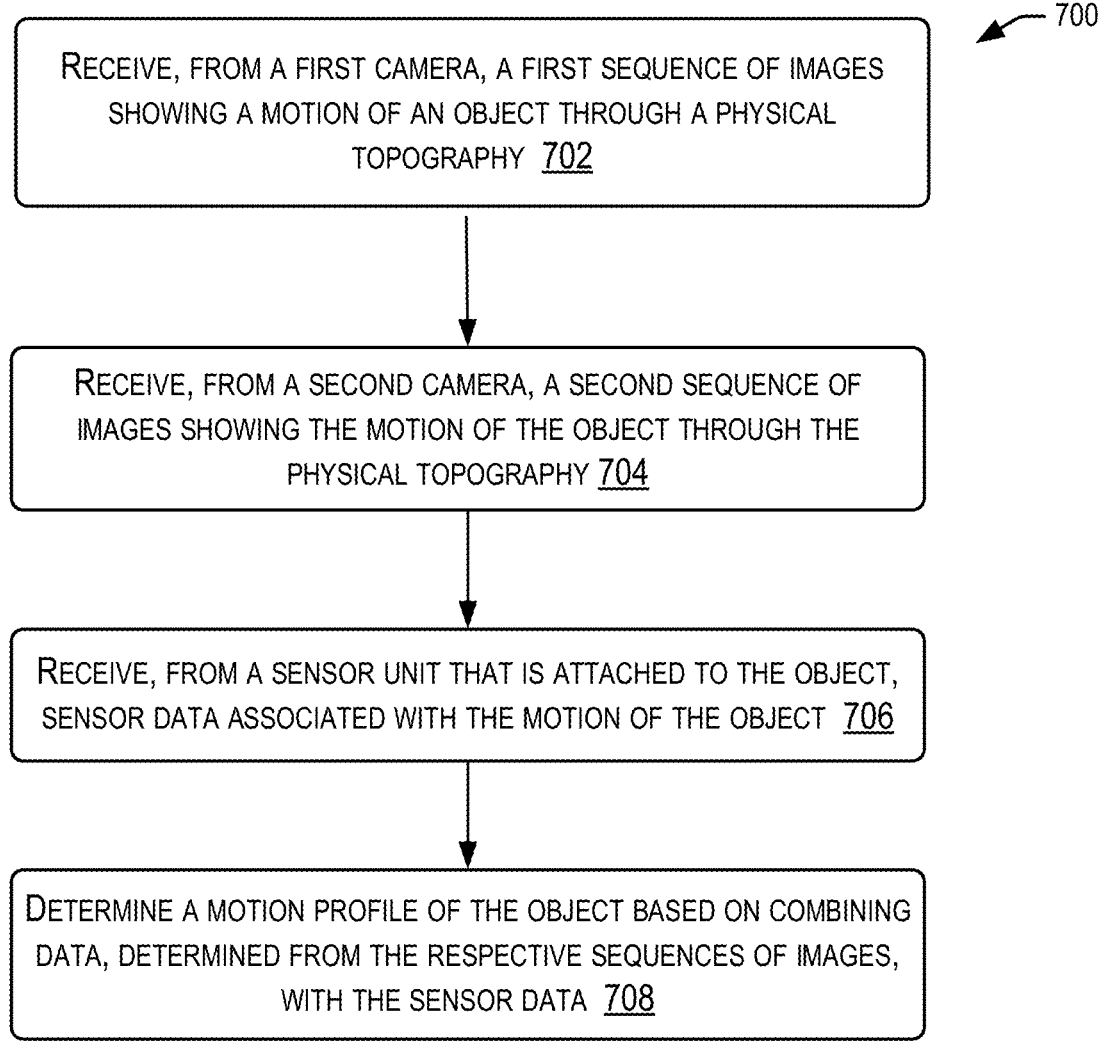
FIG. 7 is another flow diagram illustrating a method for providing a motion profile of an object, in accordance with various embodiments.

FIG. 7 is another flow diagram illustrating a method for providing a motion profile of an object, in accordance with various embodiments.

At block 702, the process 700 includes receiving, from a first camera, a first sequence of images showing a motion of an object through a physical topography. In some embodiments, one or more operations of block 702 may be similar to block 604 of FIG. 6.

At block 704, the process 700 includes receiving, from a second camera, a second sequence of images showing the motion of the object through the physical topography. In some embodiments, the first and second camera may be cameras of a plurality of cameras that are positioned to monitor the physical topography. It should be understood that respective motions of a plurality of objects may be captured within a given sequence of images. In some cases, the same object may (or may not) be captured within the different sequences of images. For example, a tennis ball object may be captured within the first sequence of images, but may not be captured within the second sequence of images. However, in this example, both sequences of images may capture a particular player in a tennis game.

At block 706, the process 700 includes receiving, from a sensor unit that is physically attached to the object, sensor data associated with the motion of the object. For example, as described herein, the object may be a tennis ball, and a sensor unit may be attached to the ball (e.g., inserted within the ball, or otherwise attached to the ball in a non-obtrusive form). In some embodiments, the sensor unit may transmit data to the computer system associated with the motion of the object. In some embodiments, the sensor unit may be transmit data associated with respective motions of one or more of a plurality of components of the object.

At block 708, the process 700 includes determining a motion profile of the object based on combining data, determined from the respective sequence of images, with the sensor data. In some embodiments, as described herein, the motion profile may be determined similarly to as described in reference to FIGS. 1 and/or 4. For example, the data may be combined based in part on mapping the respective data to a common three-dimensional coordinate space, as described herein. In some embodiments, by combining data from different sources together, techniques herein improve the fidelity (e.g., accuracy and/or precision) of motion tracking of objects over conventional techniques.

Figure 8:
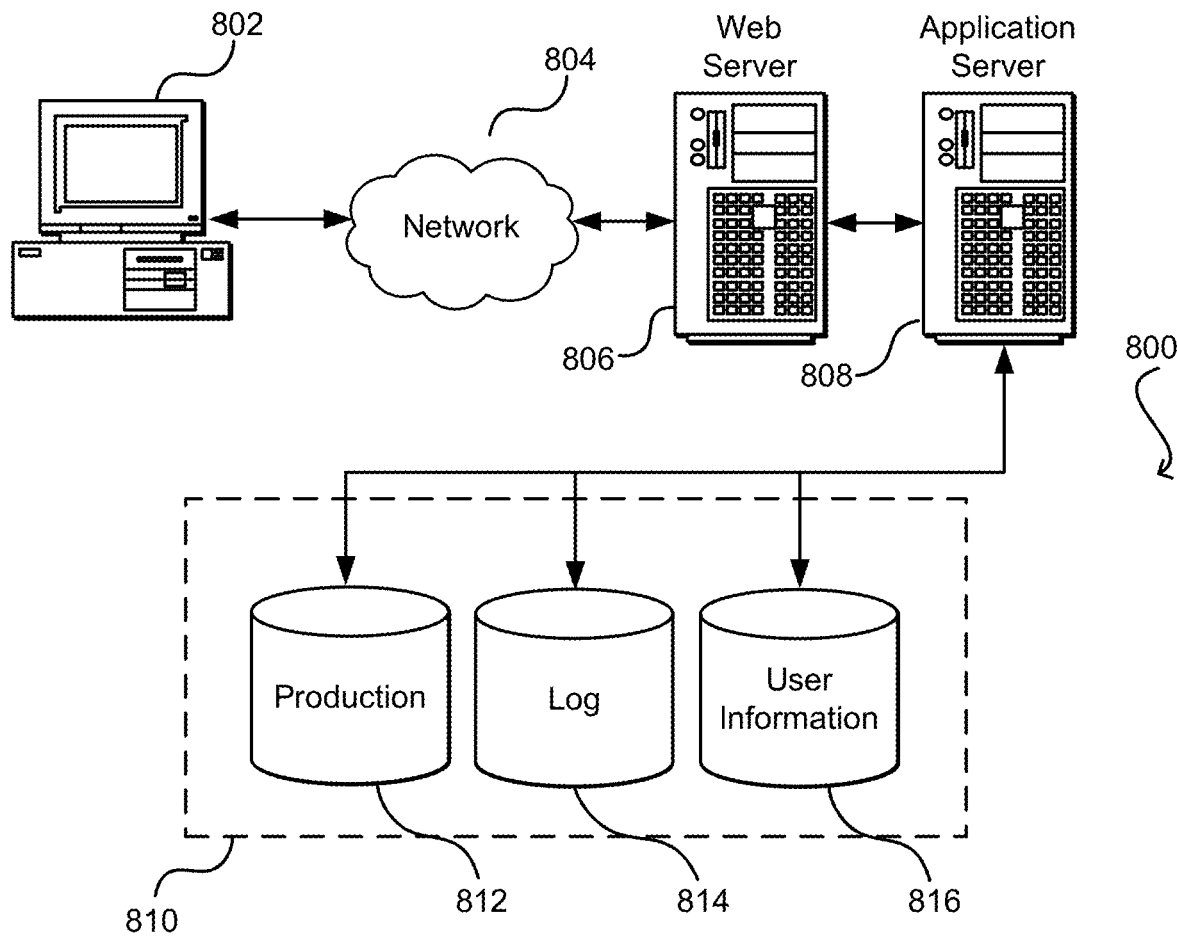
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as JavaR, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
receiving, by a computer system from a camera, a sequence of images that shows a motion of an object within a first field of view of the camera, the first field of view showing a portion of a sports arena, the portion of the sports arena mapped to a three-dimensional (3D) coordinate space, the motion occurring during an event in the sports arena;
identifying, by the computer system, an object type of the object and the object shown in the sequence of images by at least using a computer vision model that is configured for a sports type of the event and that is trained to detect the object type based at least in part on training images corresponding to the sports type of the event;
determining, by the computer system, a motion profile of the object, the motion profile mapping the motion of the object to the three-dimensional coordinate space, the motion profile indicating: (I) a three-dimensional rotation of the object, (II) a three-dimensional position of the object, or (III) the object type;
obtaining, by the computer system, a three-dimensional model of the sports arena that is associated with the portion of the sports arena, the three-dimensional model mapped to the three-dimensional coordinate space;
generating, by the computer system, a three-dimensional animation that shows the motion of the object from a vantage position that corresponds to a second field of view, the three-dimensional animation generated based at least in part on combining the motion profile of the object with the three-dimensional model of the sports arena; and
providing, by the computer system, the three-dimensional animation to a user device for presentation of the three-dimensional animation.

2. The computer-implemented method of claim 1, wherein the camera is a first camera of a plurality of cameras that, respectively, have a fixed field of view of a portion of the sports arena, the method further comprising:
receiving, by the computer system from a second camera of the plurality of cameras, a second sequence of images that shows the motion of the object within a second field of view of the second camera that shows a second portion of the sports arena, the second portion also mapped to the three-dimensional coordinate space;
identifying, by computer system, the object shown in the second sequence of images; and
determining, by the computer system, the motion profile based at least in part on combining first data, determined using the sequence of images, with second data that is determined using the second sequence of images.

3. The computer-implemented method of claim 1, wherein the motion profile further includes additional data that is associated with at least one of: (IV) a three-dimensional velocity of the object, (V) a three-dimensional acceleration of the object, or (VI) data respectively associated with component parts of the object.

4. The computer-implemented method of claim 1, wherein the object is physically attached to an inertial measurement unit (IMU) sensor, the method further comprising:
receiving, by the computer system from the IMU sensor, sensor data associated with the motion of the object; and
determining, by the computer system, the motion profile based at least in part on combining the sensor data with data determined using the sequence of images.

5. A computer system comprising one or more processors and one or more computer-readable storage media storing instructions that, upon execution by the one or more processors, cause the computer system to, at least:
receive, from a first camera of a plurality of cameras that are communicatively coupled to the computer system, a sequence of images that shows a motion of an object within a first field of view of the first camera, the first field of view showing a first portion of a physical topography, the first portion of the physical topography mapped to a three-dimensional (3D) coordinate space, the motion occurring during an event associated with the physical topography;
identify the object shown in the sequence of images by at least using a computer vision model that is configured for a sports type of the event and that is trained to detect an object type of the object based at least in part on training images corresponding to the sports type of the event;
determine a motion profile of the object that maps the motion of the object to the three-dimensional coordinate space; and
providing the motion profile to a computing service, the motion profile operable for being combined with audiovisual data associated with the motion of the object within the physical topography, at least a portion of the audiovisual data also mapped to the three-dimensional coordinate space, and wherein the combined data is provided to a user device for presentation.

6. The computer system of claim 5, wherein the one or more computer-readable storage media store further instructions that, when executed by the one or more processors, further cause the computer system to:
receive, from a second camera of the plurality of cameras, a second sequence of images that shows the motion of the object within a second field of view showing a second portion of the physical topography, the second portion also mapped to the three-dimensional coordinate space;
identify the object shown in the sequence of images; and
determine the motion profile based at least in part on combining first data, determined using the sequence of images, with second data that is determined using the second sequence of images.

7. The computer system of claim 5, wherein the one or more computer-readable storage media store further instructions that, when executed by the one or more processors, further cause the computer system to:
receive, from a sensor unit, sensor data associated with the motion of the object; and
determining the motion profile based at least in part on combining the sensor data with data determined using the sequence of images.

8. The computer system of claim 5, wherein the object includes a plurality of components, wherein the motion profile maps a motion of respective components of the plurality of components to the three-dimensional coordinate space, and wherein the combined data is provided via a three-dimensional animation that shows the respective motions of components of the plurality of components of the object.

9. The computer system of claim 5, wherein the object is one of a plurality of objects that are respectively captured within the sequence of images.

10. The computer system of claim 9, wherein a plurality of sensor units are attached, respectively, to a portion of the plurality of objects, and wherein motion profiles for the plurality of objects are respectively determined based at least in part on data received from the respective sensor units.

11. The computer system of claim 5, wherein the motion profile of the object is generated based at least in part on combining data received from: (I) the first camera, showing the motion of the object within the first field of view, (II) a second camera of the plurality of cameras, showing the motion of the object within a second field of view, and (III) at least one sensor unit attached to the object.

12. The computer system of claim 5, wherein the combined data is provided for presentation via a user interface of the user device, the user interface configured to receive a selection of a particular vantage position of a plurality of candidate vantage positions, and wherein the one or more computer-readable storage media store further instructions that, when executed by the one or more processors, further cause the computer system to:
receive input from the user device that corresponds to the selection of the particular vantage position, the particular vantage position corresponding to a second field of view of the physical topography.

13. The computer system of claim 12, wherein the object corresponds to a particular sports game participant, wherein the input corresponds to a selection of the particular sports game participant, and wherein the particular vantage position corresponds to a field of view of the particular sports game participant as they participate in a gaming environment.

14. The computer system of claim 12, wherein the plurality of candidate vantage positions respectively correspond to different aerial positions that show a unique field of view of the physical topography.

15. The computer system of claim 12, wherein updates to the user interface are provided to the user device for presentation in real-time, relative to a time period when the motion of the object is captured by the plurality of cameras.

16. The computer system of claim 12, wherein the audiovisual data includes at least one of: (I) a three-dimensional model of the physical topography that is mapped to the three-dimensional coordinate space, (II) a three-dimensional model of the object, (III) an audio stream that is associated with a particular event occurring within the physical topography during the motion of the object, or (IV) at least one video feed associated with the plurality of cameras.

17. A non-transitory computer readable medium storing specific computer-executable instructions that, when executed by a processor of a computer system, cause the computer system to:
map a portion of a physical topography, shown within a first field of view of a camera, to a three-dimensional (3D) coordinate space, the first field of view showing a first portion of a physical topography mapped to the 3D coordinate space;
receive, from the camera, a sequence of images that shows a motion of an object within the first field of view of the camera, the motion occurring during an event associated with the physical topography;
identify the object shown in the sequence of images by at least using a computer vision model that is configured for a sports type of the event and that is trained to detect an object type of the object based at least in part on training images corresponding to the sports type of the event;
determine a motion profile of the object that maps the motion of the object to the three-dimensional coordinate space;
obtain audiovisual data associated with the motion of the object through the portion of the physical topography shown within the first field of view, the audiovisual data mapped to at least one of (I) the three-dimensional coordinate space, or (II) a time period during which the motion of the object occurred;
generate a three-dimensional animation based at least in part on combining the motion profile with the audiovisual data, the three-dimensional animation showing the motion of the object from a vantage position that corresponds to a second field of view; and
provide the three-dimensional animation to a user device for presentation of the three-dimensional animation.

18. The non-transitory computer readable medium of claim 17, wherein the motion profile includes data that is associated with at least one of: (I) a rotation of the object, (II) a position of the object, (III) a velocity of the object, (IV) an acceleration of the object, (V) a type of the object, or (VI) component parts of the object.

19. The non-transitory computer readable medium of claim 17, wherein the computer vision model is one of a plurality of computer vision models each trained for a different sports event type, and wherein the computer vision model is used from the plurality of computer vision models based at least in part on the sports type of the event.

20. The non-transitory computer readable medium of claim 17, wherein the instructions, when executed by the processor, further cause the computer system to:
detect, by at least using the computer vision model, components of the object, wherein the motion profile of the object is determined based at least in part on a first component and a second component of the components and based at least in part on a first motion of the first component and a second motion of the second component.

* * * * *